(12) United States Patent
Giovannini et al.

(10) Patent No.: US 12,091,227 B2
(45) Date of Patent: Sep. 17, 2024

(54) CLOSURE ELEMENT

(71) Applicant: Guala Closures S.p.A., Spinetta-Marengo (AL) (IT)

(72) Inventors: Marco Giovannini, Luxembourg (LU); Davide Capra, Leudelange (LU); Luca Viale, Alessandria (IT); James Andrew Oldfield, Burntisland Fife (GB)

(73) Assignee: Guala Closures S.p.A., Spinetta-Maregno (IT)

( * ) Notice: Subject to any disclaimer, the term of this patent is extended or adjusted under 35 U.S.C. 154(b) by 59 days.

(21) Appl. No.: 17/913,109

(22) PCT Filed: Mar. 20, 2020

(86) PCT No.: PCT/EP2020/057819
§ 371 (c)(1),
(2) Date: Sep. 20, 2022

(87) PCT Pub. No.: WO2021/185456
PCT Pub. Date: Sep. 23, 2021

(65) Prior Publication Data
US 2023/0126968 A1    Apr. 27, 2023

(51) Int. Cl.
*B65D 51/24* (2006.01)
*B65D 51/18* (2006.01)

(52) U.S. Cl.
CPC .......... *B65D 51/245* (2013.01); *B65D 51/18* (2013.01); *B65D 2203/10* (2013.01)

(58) Field of Classification Search
CPC .......... G06K 19/07749; G06K 19/077; G06K 19/07737; B65D 2203/10; B65D 51/245; B65D 51/18

(Continued)

(56) References Cited

U.S. PATENT DOCUMENTS

2007/0273532 A1    11/2007  Philippe
2008/0149584 A1    6/2008   Martinelli
(Continued)

FOREIGN PATENT DOCUMENTS

CN    106628581 A    5/2017
EP    2865607 A1    4/2015
(Continued)

OTHER PUBLICATIONS

Foreign Communication from a Related Counterpart Application, International Search Report and Written Opinion dated Aug. 13, 2020, International Application No. PCT/EP2020/057819 filed on Mar. 20, 2020.

(Continued)

*Primary Examiner* — Brian Wilson
(74) *Attorney, Agent, or Firm* — Conley Rose, P.C.; Michael W. Piper; Elexis A. Jones

(57) ABSTRACT

A closure element for closing a container comprises an inner cap member coupled with a mouth of the container, an outer cap member movably coupled to the inner cap member, and a transponder having a chip and an antenna housed between the inner and outer cap members. The closure element further comprises two first capacitor plates connected with the chip, which are attached to one of a top wall of the inner cap member and a top wall of the outer cap member, and a second capacitor plate attached to the other of the top wall of the inner cap member and the top wall of the outer cap member, such that a relative movement of the outer cap member and the inner cap member switches the closure element between a first configuration and a second configuration having a different capacitance between the first and second capacitor plates.

23 Claims, 19 Drawing Sheets

(58) Field of Classification Search
USPC .......................................... 340/572.1–572.9
See application file for complete search history.

(56) References Cited

U.S. PATENT DOCUMENTS

| | | | |
|---|---|---|---|
| 2008/0238675 | A1 | 10/2008 | Yang |
| 2008/0314900 | A1* | 12/2008 | Biesecker .......... B65D 41/0492 235/492 |
| 2015/0186770 | A1* | 7/2015 | Arai .................. B65D 41/3447 235/492 |
| 2017/0297790 | A1 | 10/2017 | Porte et al. |
| 2023/0130229 | A1 | 4/2023 | Giovannini et al. |

FOREIGN PATENT DOCUMENTS

| | | |
|---|---|---|
| EP | 3040913 A1 | 7/2016 |
| JP | 2009001326 A | 1/2009 |
| KR | 100967340 B1 | 7/2010 |
| RU | 2622806 C2 | 6/2017 |
| RU | 2696894 C2 | 8/2019 |
| RU | 2706247 C2 | 11/2019 |
| WO | 2005024745 A2 | 3/2005 |
| WO | 2021185456 A1 | 9/2021 |
| WO | 2021185457 A1 | 9/2021 |

OTHER PUBLICATIONS

Ex-Parte Quayle Action dated Jul. 12, 2023, U.S. Appl. No. 17/913,120, filed Sep. 20, 2022, U.S. Appl. No. 17/913,120.
Foreign Communication from a Related Counterpart Application, International Search Report and Written Opinion dated Sep. 9, 2020, International Application No. PCT/EP2020/057831 filed on Mar. 20, 2020.
Foreign Communication from a Related Counterpart Application, Russian Office Action and Search Report dated Jul. 11, 2023, Russian Application No. 2022127074/28(059197) filed Mar. 20, 2020.
Foreign Communication from a Related Counterpart Application, Russian Office Action and Search Report dated Jul. 13, 2023, Russian Application No. 2022127076/03(059201) filed Mar. 20, 2020.
Notice of Allowance dated Oct. 6, 2023, U.S. Appl. No. 17/913,120 filed on Sep. 20, 2022.

* cited by examiner

CLOSURE ELEMENT

CROSS-REFERENCE TO RELATED APPLICATIONS

The present application is a filing under 35 U.S.C. 371 as the National Stage of International Application No. PCT/EP2020/057819, filed Mar. 20, 2020, entitled "CLOSURE ELEMENT," which is incorporated herein by reference in its entirety for all purposes.

TECHNICAL FIELD

The present invention refers to a closure element for closing a container like a bottle, canister, or the like.

BACKGROUND

In the context of bottling of high quality and valued beverages, closure elements having anti-tampering means are used. In particular, a known closure element comprises a transponder, such as an RFID tag (sometimes also called IC tag), which is modified in its structure when opened.

An RFID tag generally comprises a chip and an antenna, as well as sometimes a piece of control loop separately connected to the chip. When opening the closure member, either the antenna can be interrupted so that the chip cannot be read out any more, or the piece of loop can be interrupted to thus change the state of the chip. In particular, the interruption of the antenna or loop is realized by rotating the closure member with the tag with respect to the neck of the bottle/neck label).

If, in the unopened state, the chip is interrogated by bringing a reading device (for example in a mobile phone) close to the antenna, the transponder in the RFID tag communicates its unopened state. If the transponder is interrogated after the piece of loop has been interrupted upon opening the closure, it communicates that the closure member has been opened. If the antenna has been interrupted, readout is no longer possible, and the user should be wary.

Conventionally, the antenna or the control loop is interrupted by using a cutting means or the like.

Therefore, if the RFID tag or a part thereof is damaged, readout is affected, and the consumer can recognize that the closure member has been removed or that an attempt to manipulate the closure member should be considered.

In the industry, it is particularly desired to provide high-value beverages such as wine and spirits with closures like the above. However, closure members like the above are complicated in manufacturing and in assembling onto the bottle or container. In addition, as in the known closure members a mechanical break is strictly necessary to perform the anti-tempering function, a great precision in their manufacturing is necessary and, sometimes, the reliability of the closure elements is not completely satisfying.

Indeed, the cutting means has to be designed and realized with high precision to ensure that the interaction between the cutting means and the part of the RFID tag to break is effective.

As mentioned, the interruption of the control loop causes a change of the properties of the closure element which can be detected by means of a suitable reader, in particular a change of the state of the chip to which the control loop is connected, and thus a change of the readout signal. In this respect, the chip may be configured to set the status to undisturbed/disturbed in response to an undisturbed/disturbed state of the control loop. For example, the status of the control loop is set to the disturbed status in response to a change in either an inductance or a capacitance of the control loop when it is cut or broken.

Disadvantageously, with the above-mentioned control loop, the configuration of the closure element is rather complex in terms of manufacture and also the installation of the closure element on the container is difficult and attention is to be paid in this specific step as the detection element is to be correctly attached to the container.

SUMMARY OF THE INVENTION

It is, therefore, an object of the invention to provide a closure element which is easy to be manufactured and assembled and which provides high reliance.

The subject-matter of claim 1 provides a closure element with features for addressing this object. Further preferred embodiments are mentioned in the dependent claims and/or outlined in the following description.

According to the invention, the closure element further comprises at least two first capacitor plates connected with the chip, wherein the two first capacitor plates are attached to one of the top wall of the inner cap member and the top wall of the outer cap member. In addition, the closure element comprises at least a second capacitor plate attached to the other of the top wall of the inner cap member and the top wall of the outer cap member, in such a way that a relative movement of the outer cap member and the inner cap member switches the closure element between a first configuration in which each of the first capacitor plates and the second capacitor plate define a capacitor having a first capacitance and a second configuration in which the first capacitor plates and the second capacitor plate define a capacitor having a second capacitance different from the first one.

In detail, each of the first capacitor plates defines a capacitor with the second capacitor plate. Thus, two capacitors in series are defined with a total electrical capacitance depending on the configuration of the first capacitor plates and the second capacitor plate. The configuration includes distance and overlap between each first capacitor plate and the second capacitor plate as well as the dielectric medium between them.

Once the closure element is interrogated by means of a reader, an electrical field is defined in the capacitor and the voltage measurable at the ends of the first plates, which are connected with the RFID chip, depends on the configuration of the plates. Therefore, the information readable from the RFID chip is representative of the first or second configuration of the closure element.

In view of the above, it is possible to detect if the closure element is changed in its configuration (i.e., if the closure element has been opened) in an easy way and the design and manufacturing of the closure element are simplified. In addition, also the application of the closure element on a container is simplified as it is not necessary to join any detecting portion on the neck of the container.

Advantageously, in the closure element according to another aspect of the invention, in the first configuration, the first capacitor plates and the second capacitor plate are disposed in a first relative position and, in the second configuration, the first capacitor plates and the second capacitor plate are disposed in a second relative position which is different from the first one.

In other words, by modifying the relative position between the outer cap member and the inner cap member, also the relative position between the first and second capacitor plates can be easily changed, thereby modifying the capacitance detectable. In this way, a change in the closure element configuration can be easily detected.

Advantageously, in the closure element according to another aspect of the invention, the outer cap member and the inner cap member are rotatably coupled. This feature allows an easy way to change the relative position between the outer cap member and the inner cap member.

Advantageously, in the closure element according to another aspect of the invention, the outer cap member and the inner cap member are movable along a longitudinal direction. This feature provides an alternative way to easily and quickly change the relative position between the outer cap member and the inner cap member.

Advantageously, in the closure element according to another aspect of the invention, the first capacitor plates and the second capacitor plate are overlapping and, in the second relative position, the first capacitor plates and the second capacitor plate are not overlapping.

According to this aspect, when the first capacitor plates and the second capacitor plate are overlapping, the electrical capacitance measurable is maximum and, when the first capacitor plates and the second capacitor plate are overlapping, the electrical capacitance measurable is minimum. Therefore, the difference in electrical capacitance measurable is the highest possible and the change in configuration can be easily detected.

Advantageously, in the closure element according to another aspect of the invention, the area of the two first capacitor plates, in combination, and the area of the second capacitor plate are substantially the same. This feature allows the capacitor to have a sufficiently high capacitance in order to better detect the change of configuration.

Advantageously, in the closure element according to another aspect of the invention, the shape of the two first capacitor plates, in combination, and the shape of the second capacitor plate are substantially the same. Also this feature allows the capacitor to have a sufficiently high capacitance in order to better detect the change of configuration.

Advantageously, in the closure element according to another aspect of the invention, each first capacitor plate comprises at least a first portion shaped as a circular sector. Due to this feature, it is possible to provide the first capacitor plates having a sufficient area in a closed and reduced space between the outer cap member and the inner cap member.

Advantageously, in the closure element according to another aspect of the invention, the first portions of the first capacitor plates are next to each other on the same plane.

This allows arranging the first capacitor plates in an efficient disposition in the closed and reduced space between the outer cap member and the inner cap member.

Advantageously, in the closure element according to another aspect of the invention, the second capacitor plate comprises at least a portion shaped as a circular sector. Due to this feature, it is possible to provide the second capacitor plate having a sufficient area in a closed and reduced space between the outer cap member and the inner cap member.

Advantageously, in the closure element according to another aspect of the invention, each first capacitor plate comprises a second portion having the shape of a circular sector, each first portion being concentric to the corresponding second portion, wherein each first portion is electrically connected to the respective second portion. This allows to maximize the area of the first capacitor plates in order to increase the electrical capacitance.

Advantageously, in the closure element according to another aspect of the invention, the second capacitor plate comprises a plurality of portions, each portion being shaped as a circular sector; the portions being electrically connected to each other. This allows to maximize the area of the second capacitor plate in order to increase the electrical capacitance.

Advantageously, in the closure element according to another aspect of the invention, in the first configuration, the second capacitor plate has a first shape and in the second configuration the second capacitor plate has a second shape which is different from the first one. This means that the electrical capacitance of the capacitor defined between the first and the second plates can be changed by modifying the shape of the second plate when moving the outer cap member with reference to the inner cap member.

Advantageously, in the closure element according to another aspect of the invention, the second capacitor plate comprises a plurality of capacitor portions configured to be electrically connected to each other in the first configuration and electrically disconnected in second configuration. In other words, during the switching of configurations, the capacitor portions of the second capacitor plate, which are originally connected to each other, are separated due to the relative movement of the outer cap member and the inner cap member. When the capacitor portions are separated, the overall area of the second capacitor plate changes, thereby modifying the electrical capacitance of the capacitor defined between the first and second capacitor plates.

Preferably, in the closure element according to this aspect of the invention, the second capacitor plate comprises a first ring attached to one of the outer cap member and the inner cap member and a second ring attached to the other of the outer cap member and the inner cap member; wherein the capacitor portions are connected between the first ring and the second ring. This configuration allows the capacitor portions of the second capacitor plate to be disconnected from each other due to the torque generated between the first ring and the capacitor portions, and the second ring and the capacitor portions by simply rotating the outer cap member with reference to the inner cap member.

Advantageously, in the closure element according to another aspect of the invention, the portions are connected to the first ring and the second ring by means of breakable bridges. This feature allows a simple and quick separation of the portions of the second capacitor plate.

Advantageously, in the closure element according to another aspect of the invention, the portions are trapezoidal-shaped and evenly angularly spaced. According to this feature, the portions can be arranged in such a way to maximize the overall area of the second capacitor plate.

Advantageously, in the closure element according to another aspect of the invention, the first ring presents an edge connected to the outer cap member; the edge being shaped such that the first ring is rotatably fastened to the outer cap member; wherein the second ring presents an edge connected to the inner cap member; the edge being shaped such that the second ring is rotatably fastened to the inner cap member. Due to this feature, it is possible to determine a relative rotation between the first and the second ring while rotating the outer cap member with respect to the inner cap member. This relative rotation of the rings causes the shear action which breaks the portions from the rings. In this way, the shape and the overall area of the second capacitor plate changes, thereby modifying the electrical capacitance.

Advantageously, in the closure element according to another aspect of the invention, the inner cap member presents a groove arranged between the top wall and the side wall of the inner cap member, the groove facing the outer cap member; the outer cap member comprising a tooth arranged between the top wall and the side wall of the outer cap member; the tooth being slidingly housed in the groove; wherein the groove extends only in part along the circumferential extension of the inner cap member. This allows the outer cap member to rotate around the inner cap member to determine a relative rotation of the portions of the substrate in such a way to obtain the torsion necessary to break the portion of the control loop. In addition, when the tooth reaches the end of the groove, the rotation of the outer cap member determines the rotation of the inner cap member in order to unscrew the closure element.

Advantageously, in the closure element according to another aspect of the invention, the transponder is an RFID tag; preferably the transponder being an NFC tag.

This allows providing a largely available, reliable and inexpensive transponder.

Advantageously, the closure element according to another aspect of the invention further comprises blocking means active between the outer cap member and the inner cap member to impede switching from the second configuration to the first configuration.

This allows the closure element to permanently inform the user that the closure element has been previously opened.

Advantageously, in the closure element according to another aspect of the invention, the blocking means comprises a spacer member operatively placed between the outer cap member and the inner cap member; the spacer member being switchable from a first arrangement in which it is fitted in a cavity formed at a joining portion between the top wall and the side wall of the inner cap member to a second arrangement in which the spacer member lies between the top wall of the inner cap member and the top wall of the outer cap member.

These features allow to define simple blocking means which are easy to install and which are very reliable.

BRIEF DESCRIPTION OF THE DRAWINGS

The invention may be better understood with reference to the following specification disclosed in preferred embodiments thereof and taken in conjunction with the following accompanying drawings in which.

Figure 1A:
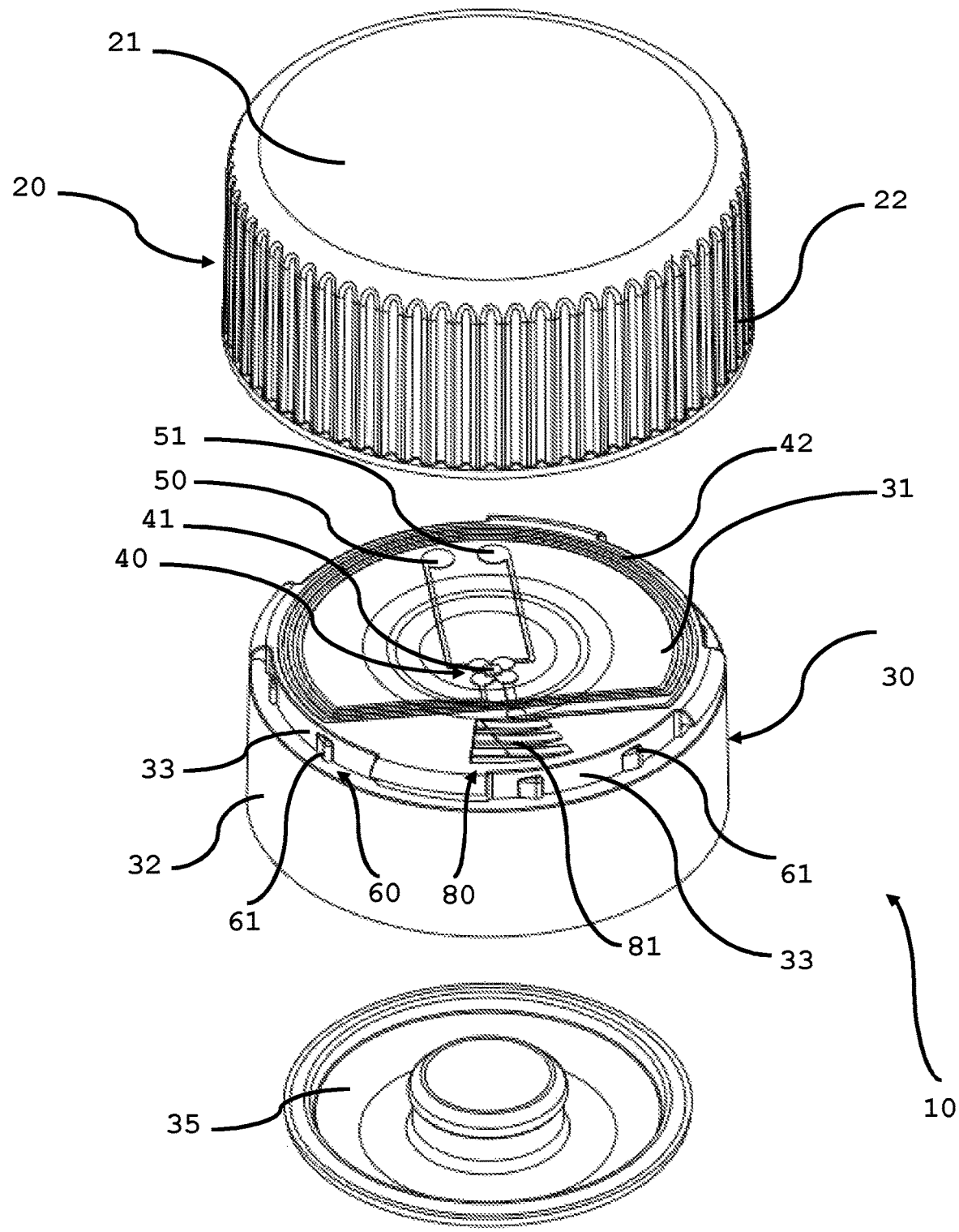
FIG. 1a is an exploded, lateral view according to a first view direction of a first embodiment of the closure element of the present invention.

The description and the accompanying drawings are to be construed by ways of example and not of limitation.

DETAILED DESCRIPTION OF PREFERRED EMBODIMENTS

Embodiments of the invention will be described in further detail in the following. Modifications of certain individual features in this context can be combined with other features, thereby providing additional embodiments.

According to a first embodiment, FIGS. 1 and 2 show a closure element 10 comprising an outer cap member 20 and an inner cap member 30 coupled with the outer cap member 20. The inner cap member 30 is to be coupled with a mouth of a container (not shown) in a rotatably fixed manner. In this regard, the inner cup portion 30 comprises a screw portion 34 for coupling with the mouth of the container.

The outer cap member 20 comprises a top wall 21, preferably of circular shape, and a side wall 22, preferably of cylindrical shape, extending from an edge of the top wall 21. The inner cap member 30 comprises a top wall 31, preferably of circular shape, and a side wall 32, preferably of cylindrical shape, extending from an edge of the top wall 31.

The screw portion 34 is realised on the inside of the side wall 32 of the inner cap member 30.

The outer cap member 20 is rotatably coupled to the inner cap member 30 in such a way that the outer cap member 20 can rotate with reference to the inner cap member 30 for a first part of its movement and then, after the outer cap member 20 engages the inner cap member 30, both the outer cap member 20 and the inner cap member 30 rotate together in a second part of the movement to unscrew the closure element 10.

In this regard, with reference to FIG. 1a, the inner cap member 30 presents at least a groove 33 arranged between the top wall 31 and the side wall 32 thereof. The groove 33 extends only in part along the circumferential extension of the inner cap member 30. Preferably, the inner cap member 30 presents a plurality of grooves 33, each having the same length. They may also be evenly angularly spaced, i.e. arranged in equal intervals around the circumference of the inner cap member 30.

The grooves 33 face the outer cap member 20. The grooves 33 face a junction zone between the top wall 21 and the side wall 22 of the outer cap member 20.

Figure 1B:
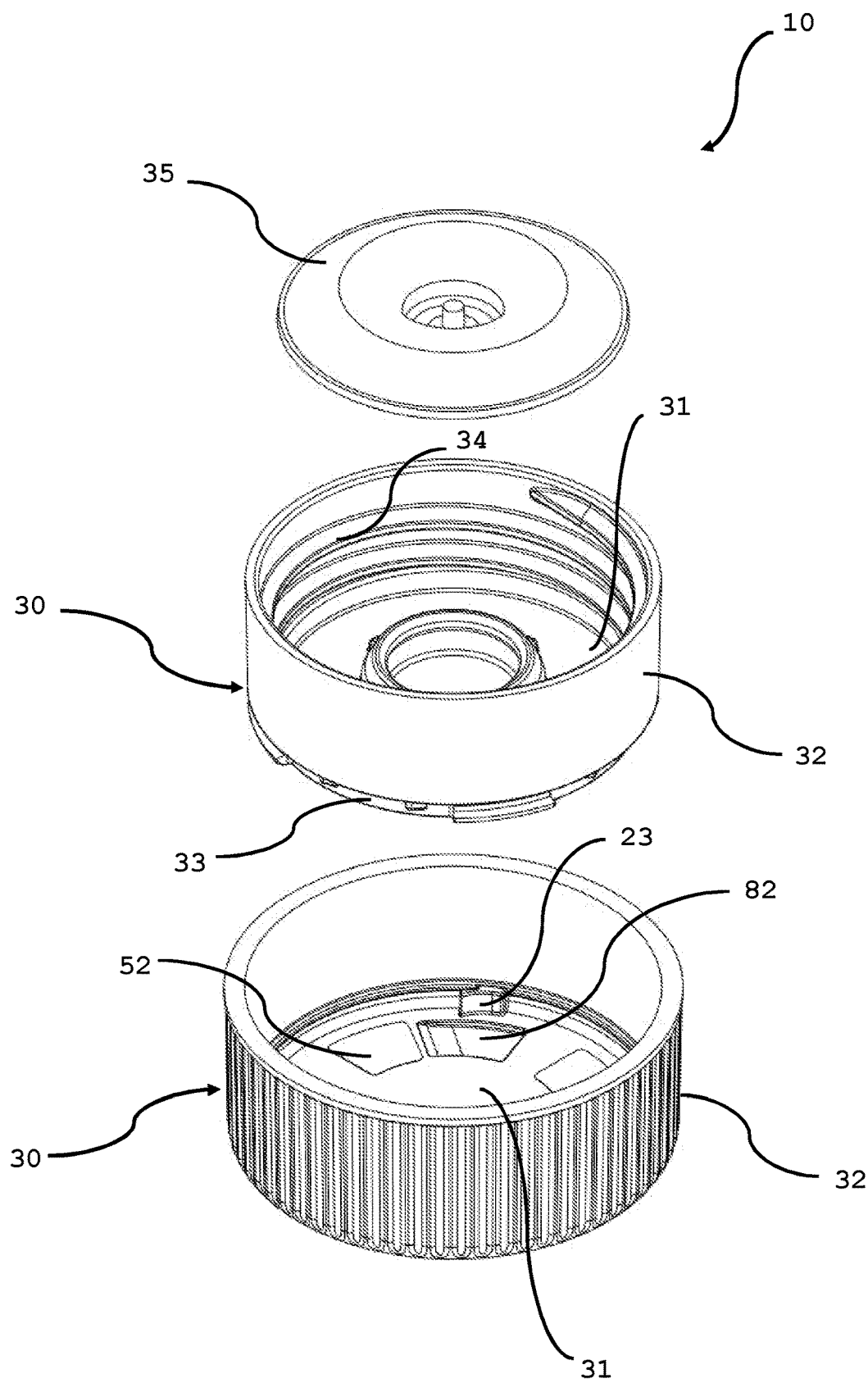
FIG. 1b is an exploded, lateral view according to a second view direction of the embodiment shown in FIG. 1.

The outer cap member 20 comprises at least a tooth 23 arranged between the top wall 21 and the side wall 22 thereof (see FIG. 1b). Preferably, the outer cap member 20 comprises a plurality of teeth 23 which are evenly angularly spaced.

Each tooth 23 is housed in a corresponding groove 33 in such a way that it can slide along the groove 33. When the teeth 23 reach the ends of the respective grooves 33, the outer cap member 20 engages the inner cap member 30 and the outer cap member 20 transmits the rotation movement to the inner cap member 30 to unscrew the closure element 10 and open the container.

According to the invention, the closure element 10 further comprises a transponder 40 housed between the inner cap member 30 and the outer cap member 20. In detail, the transponder 40 is arranged between the top wall 21 of the outer cap member 20 and the top wall 31 of the inner cap member 30.

The transponder 40 can be active or passive. Preferably, the transponder is of the passive type. Preferably, the transponder 40 is an RFID tag. More preferably, the transponder 40 is an NFC ("near field communication") tag. An NFC tag is based on high frequency (HF)-RFID technology but operates only on very short ranges (of the order of a few centimetres).

The transponder 40 comprises a chip 41 and an antenna 42.

According to the invention, the chip 41 and the antenna 42 of the transponder 40 are attached to one of the top wall 31 of the inner cap member 30 and the top wall 21 of the outer cap member 20.

In the present invention, the antenna 42 is arranged in such a way to lie in a C-shaped area.

Preferably, the transponder 40 and in particular the chip 41 and the antenna 42 are attached to the top wall 31 of the inner cap member 30.

More preferably, the transponder 40 and in particular the chip 41 and the antenna 42 are directly attached to the top wall 31 of the inner cap member 30. For example, the chip 41 and the antenna 42 of the transponder 40 are directly printed on the top wall 31 of the inner cap member 30.

Alternatively, the transponder 40 can be arranged on a support (not shown) distinct from the top wall 31 of the inner cap member 30 and attached thereto by means of an adhesive layer.

According to the invention, the closure element 10 further comprises two first capacitor plates 50, 51. The first capacitor plates 50, 51 are arranged on one of the top wall 21 of the outer cap member 20 and the top wall 31 of the inner cap member 30. Preferably, the first capacitor plates 50, 51 are arranged on the same top wall where the chip 41 and the antenna 42 of the transponder 40 are placed.

According to the invention, the first capacitor plates 50, 51 are arranged on the top wall 31 of the inner cap member 30. Preferably, the first capacitor plates 50, 51 are directly arranged on the top wall 31 of the inner cap member 30. For example, the first capacitor plates 50, 51 are directly printed on the top wall 31 of the inner cap member 30.

Each first capacitor plate 50, 51 is directly and individually connected to the chip 41 of the transponder 40.

The closure element 10 further comprises at least a second capacitor plate 52 arranged on the other of the top wall 31 of the inner cap member 30 and the top wall 21 of the outer cap member 20.

In this way, the first capacitor plates 50, 51 and the second capacitor plate 52 define, in combination, a capacitor having a detectable electric capacitance.

In accordance with FIG. 1b, the second capacitor plate 52 is arranged on the top wall 21 of the outer cap member 20. In detail, the second capacitor plate 52 is arranged on a surface of the top wall 21 of the outer cap member 20 facing a surface of the top wall 31 of the inner cap member 30 housing the transponder 40.

It should be noted that, according to an alternative embodiment (not shown), the first capacitor plates 50, 51 together with the transponder 40 may be placed on the top wall 21 of the outer cap member 20 and the second capacitor plate 52 are arranged on the top wall 31 of the inner cap member 30.

In any case, the relative rotation of the outer cap member 20 with respect to the inner cap member 30 determines a modification of the relative position between the first capacitor plates 50, 51 and the second capacitor plate 52.

In detail, due to the cited relative rotation, the closure element 10 is switched between a first configuration in which the first capacitor plates 50, 51 and the second capacitor plate 52 are in a first relative position and a second configuration in which the first capacitor plates 50, 51 and the second capacitor plate 52 are in a second relative position.

For example, the first configuration can be representative of a closed configuration of the closing element 10, while the second configuration can be representative of an opened configuration of the closing element 10.

As a consequence, the switching of the closing element 10 from the first to the second configuration is representative of the fact that the container has been previously opened.

In detail, when the closure element 10 is interrogated by means of a reader, an electrical field is generated between the first capacitor plates 50, 51 and the second capacitor plate 52.

The intensity of the electrical field depends on the capacitance of the capacitor defined by the first capacitor plates 50, 51 and the second capacitor plate 52. As already stated, the capacitance depends on a plurality of factors as, for example, the materials and shapes of the plates, the material of the dielectric between the plates.

According to the present embodiment, the only variable factor determining the capacitance is the relative position between the plates.

The electrical field between the plates 50, 51, 52 determines a certain voltage at the ends of the first capacitor plates 50, 51 connected to the chip 41 of the transponder 40.

Therefore, the voltage is a function of the relative position between the first capacitor plates 50, 51 and the second capacitor plate 52.

The voltage at the ends of the first capacitor plates 50, 51 modifies the response that the transponder 40 is able to send when interrogated by the reader. In other words, the response read by the reader is a function of the relative position between the first capacitor plates 50, 51 and the second capacitor plate 52.

Therefore, the reader is able to identify the closed configuration and the opened configuration.

In addition, the closure element 10 of the first embodiment further comprises blocking means 60 to impede the closure element 10 to be returned to the first configuration, once the switching from the first configuration to the second configuration has been performed.

This allows the switching to be permanent and irreversible.

The blocking means 60 comprises blocking ribs 61 protruding in the grooves 33 arranged between the top wall 31 and the side wall 32 of the inner cap member 30.

In this embodiment, the blocking ribs 61 are wedge-shaped, i.e. they form an inclined guide surface with respect to the tangent of the circumference of the grooves 33.

When the outer cap member 20 rotates with respect to the inner cap member 30, the teeth 23 move along the grooves 33, sliding up on the inclined guide surface of the blocking ribs 61, overcoming them and snapping back into the groove 33. Since the blocking ribs 61 are wedge-shaped, the return rotation of the outer cap member 20 with respect to the inner cap member 30 is impeded.

The closure element 10 according to the first embodiment further comprises lifting means 80 to lift the outer cap member 20 with respect to the inner cap member 30 when the outer cap member 20 is rotated with respect to the inner cap member 30.

This provides a further relative movement of the outer cap member 20 with respect to the inner cap member 30.

The lifting means 80 is provided on the top wall 31 of the inner cap member 30. In detail, the lifting means 80 comprises at least one lifting rib 81 protruding from the top wall 31 of the inner cap member 30, the lifting rib 81 having an end.

The lifting rib 81 is configured to be housed in a recess 82 arranged on the top wall 21 of the outer cap member 20 in the first (closed) configuration.

More in detail, when the closure element 10 is switched from the first (closed) configuration to the second (opened) configuration, the lifting rib 81 exits the recess 82, contacting the top wall 21 of the outer cap member 20, scraping against the top wall 31 and lifting the outer cap member 20 with respect to the inner cap member 30.

The respective shapes of the lifting rib 81 and that of the recess 82 allow the lifting rib 81 to exit the recess 62.

The lifting rib 81 is substantially wedge-shaped and extends along an arc of circle concentric to the centre of the top wall 31 of the inner cap member 30, having a length corresponding to an arc of 30°, for example.

As shown in FIG. 1a, the lifting means 80 comprises a plurality of lifting rib 81. In the disclosed embodiment, the lifting means 80 comprises three lifting ribs 81.

The lifting ribs 81 61 are disposed alongside each other along a radial direction of the top wall 31 of the inner cap member 30. Each lifting rib 81 is shaped as an arc of circle concentric to each other.

The lifting ribs 81 are arranged close to an edge of the top wall 31 of the inner cap member 30. The recess 82 is arranged in correspondence of the lifting ribs 81. Therefore, the recess 82 is arranged close to an edge of the top wall 21 of the outer cap member 20.

The recess 82 comprises a ramp which allows the lifting ribs 81 to slide out of the recess 82.

The closure element 10 preferably also comprises a cap liner 35 which is coupled to the inner cap member 30 to provide a seal between the closure element 10 and the container mouth.

In detail, the cap liner 35 is coupled to the inner cap member 30 by means of a coupling protrusion 36 protruding from a surface of the top wall 31 opposite to a surface connected with the substrate 50.

According to an embodiment which is not disclosed, the outer cap member 20 and the inner cap member 30 are movable with respect to each other in a longitudinal direction. With more detail, the outer cap member 20 and the inner cap member 30 are movable with respect to each other exclusively in a longitudinal direction.

In the context of the present description, the longitudinal direction is defined as a direction parallel to a central axis of symmetry of the closure element 10. For example, in the context of a closure element for a bottle, this axis coincides with the longitudinal axis of the bottle neck.

Figure 2A:
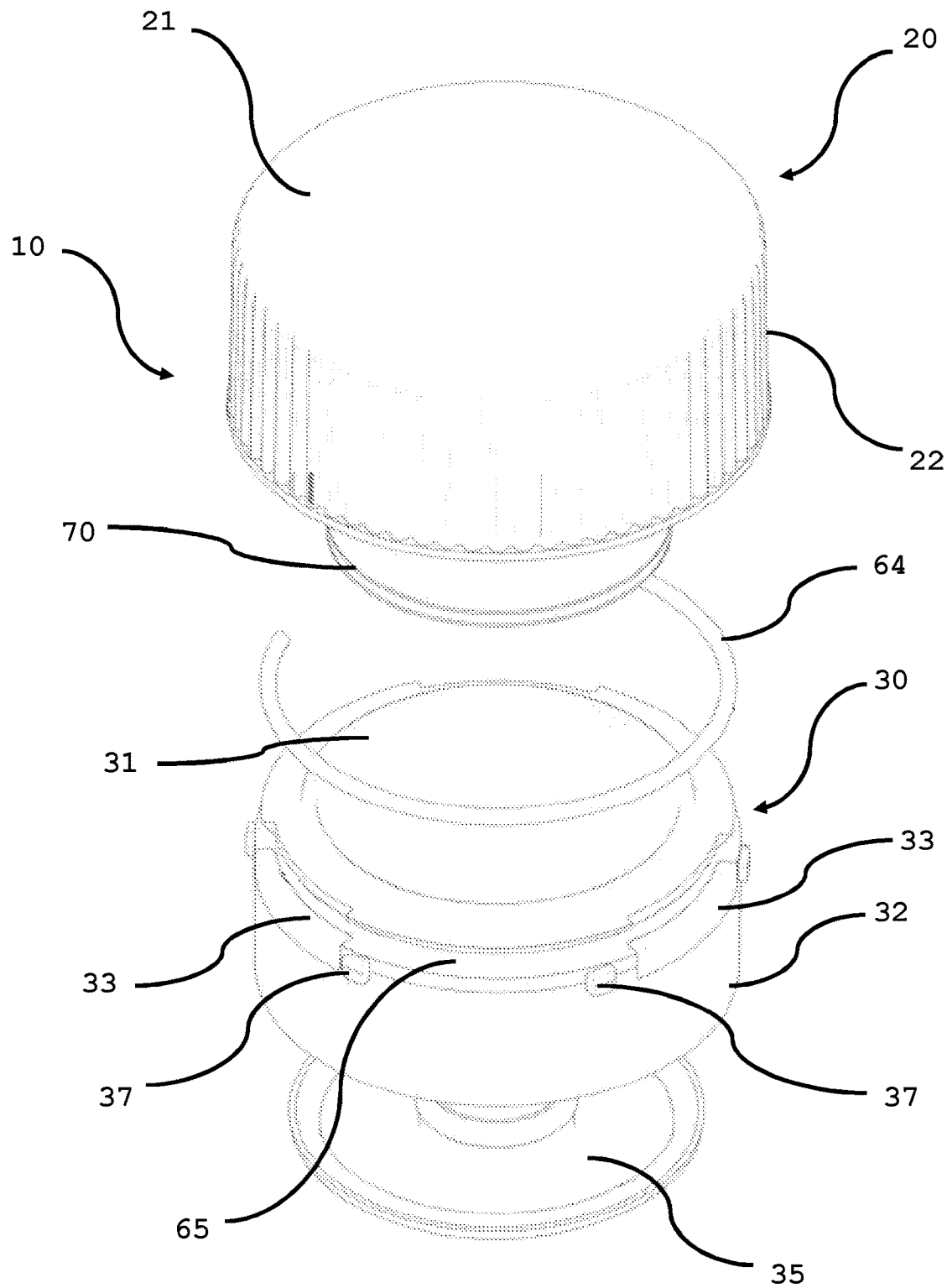
FIG. 2a is an exploded view of a second embodiment of the closure element according to the invention.
Figure 2B:
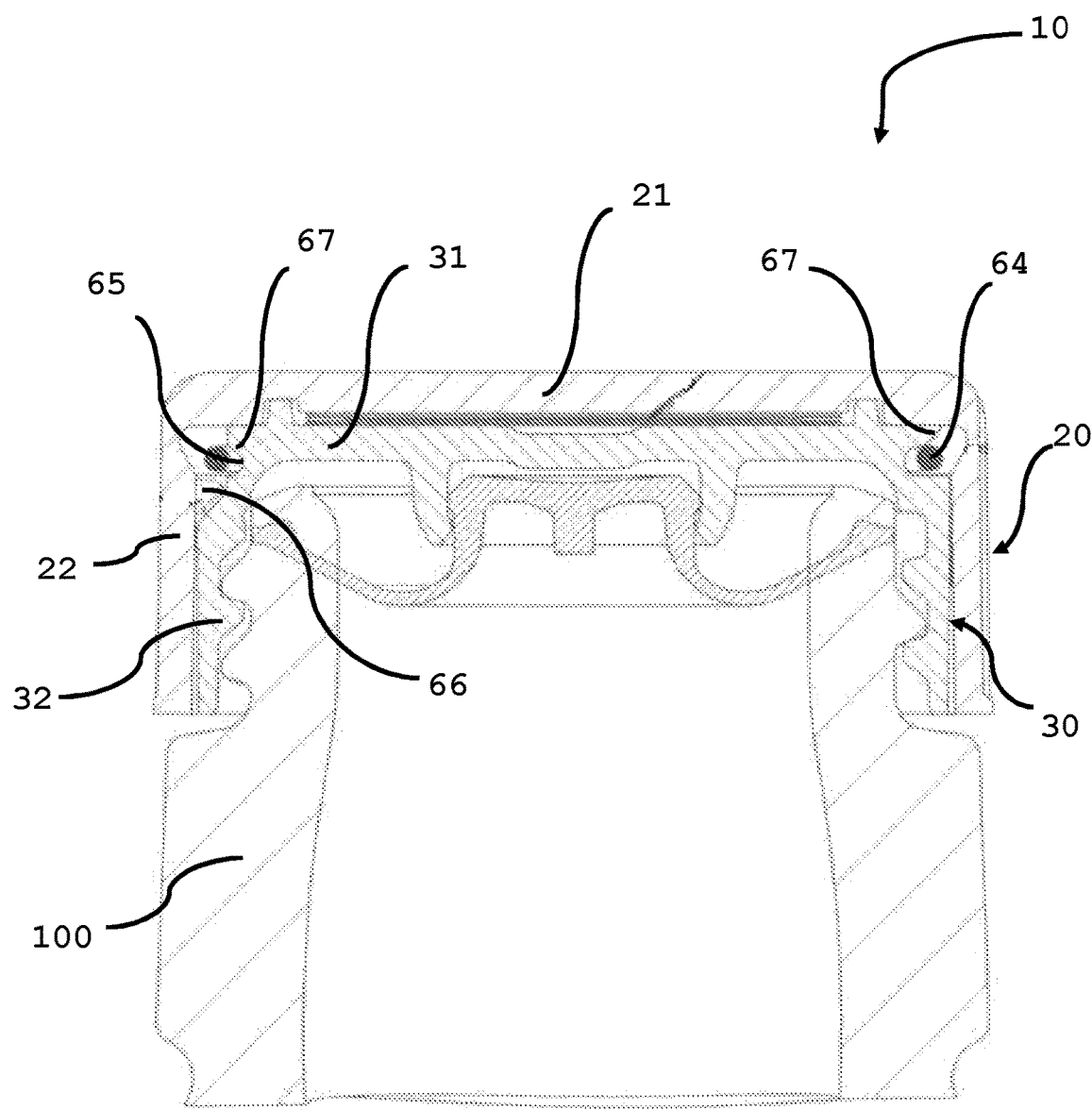
FIGS. 2b and 2c are lateral sectional views of the second embodiment in two different arrangements.
Figure 2C:
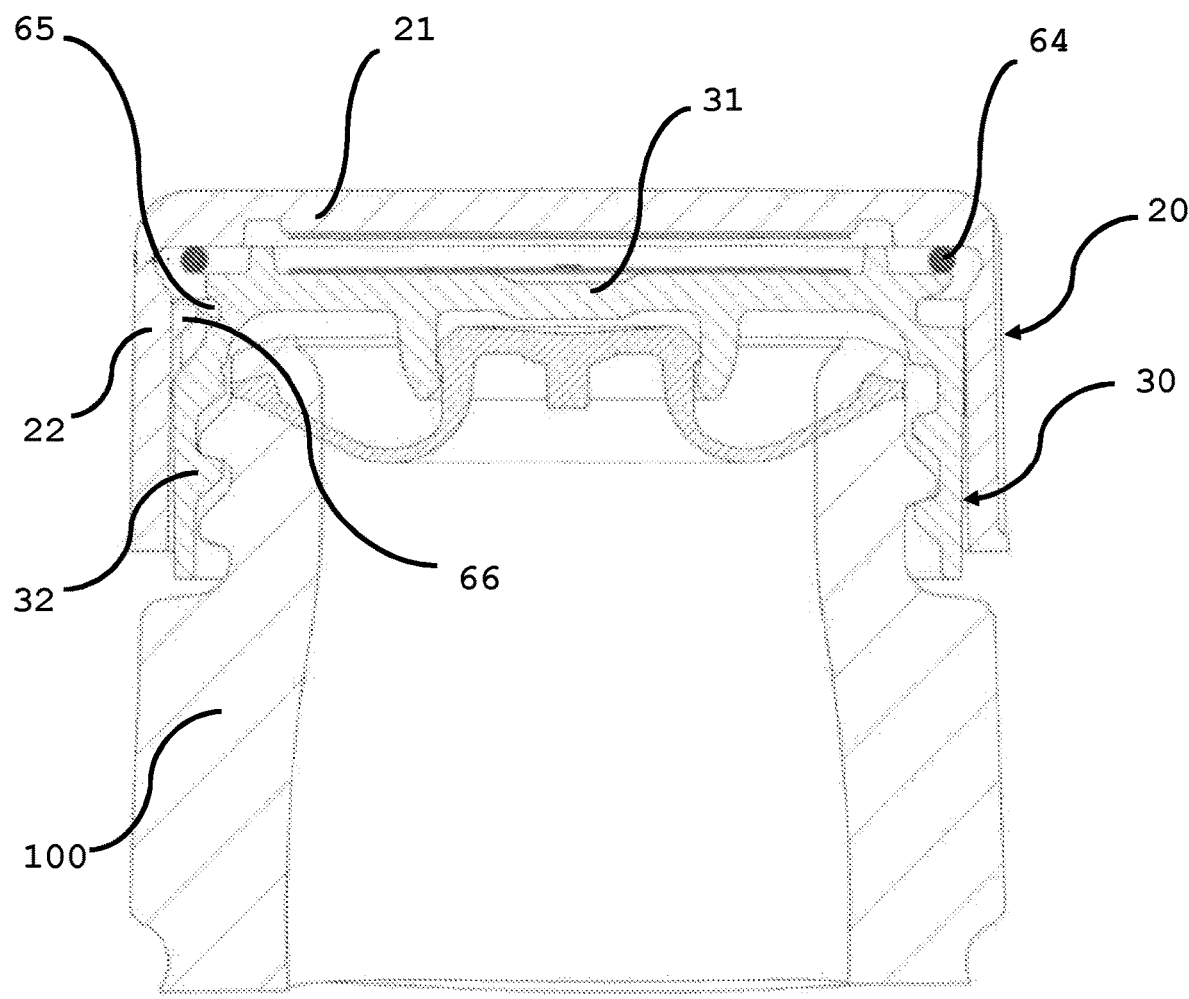

A second embodiment of the present invention is shown in FIGS. 2a to 2c, with like numerals referring to like features of the first embodiment. As in the first embodiment, the inner cap member 30 can be coupled to, in particular screwed onto the mouth of container 100, such as a bottle (see. FIGS. 2b and 2c). In the second embodiment, the outer cap member 20 and the inner cap member 30 are movable with respect to each other both in a rotational direction and in the longitudinal direction. In detail, the outer cap member 20 and the inner cap member 30 are movable with respect to each other in the longitudinal direction while rotating the outer cap member 20 with respect to the inner cap member 30, i.e., during switching from the closed configuration to the opened configuration. In this way, the distance in the longitudinal direction between the first capacitor plates 50, 51 and the second capacitor plate 52 is modified when opening the closure element 10.

In detail, the distance between the top wall 21 of the outer cap member 20 and the top wall 31 of the inner cap member 30 increases when switching from the first (closed) configuration to the second (opened) configuration. In other words, the outer cap member 20 lifts with respect to the inner cap member 30 when switching from the first (closed) configuration to the second (opened) configuration.

In addition, dogs 37 are placed on the inner cap member 30. In particular the dogs 37 are placed on the side wall 32 of the inner cap member 30. These dogs 37 slide along corresponding thread grooves (not shown) on the inner side of side wall 22 of the outer cap member 20. These thread grooves are inclined in the sense that they follow a thread line in a way such that, when the outer cap member 20 is rotated with respect to the inner cap member 30 for opening the closure member, the outer cap member 20 is raised with respect to the inner cap member 30.

In the embodiment of FIGS. 2a to 2c, the transponder and the first capacitor plates are arranged on a substrate 70 placed between the top wall 31 of the inner cap member 30 and the top wall 21 of the outer cap member 20.

In the present case, the substrate 70 is distinct from the top wall 31 of the inner cap member 30. The substrate 70 is attached to the top wall 31 of the inner cap member 30 by means of an adhesive layer.

The closure element 10 according to the present embodiment comprises blocking means 60 to impede the closure element 10 to be brought back from the second (opened) configuration to the first (closed) configuration.

The blocking means 60 comprises a spacer member 64, in this embodiment preferably shaped as an arc of circumference and placed between the inner cap member 30 and the outer cap member 20.

The spacer member 64 is an elastic member which can be pre-tensioned. Preferably, the spacer member is shaped like a snap ring.

The spacer member 64 is constrained in a first arrangement when the closure element 10 is in the first configuration (see FIG. 2b).

In particular, in the first arrangement, the spacer member 64 is fitted in a cavity 65 formed at a portion of the inner cap member 30 corresponding to a joining portion between the top wall 31 and the side wall 32.

When the closure element 10 is switched from the first (closed) configuration to the second (opened) configuration, the spacer member 64 is switched from the first arrangement to a second arrangement (see FIG. 2c). In the second arrangement, the spacer member 64 lies on the top wall 31 of the inner cap member 30 in such a way that it is placed between the top wall 31 of the inner cap member 30 and the top wall 21 of the outer cap member 20.

In this regard, lifting hooks 66 internally protrude from the inner side of side wall 21 of the outer cap member 20 to contact the spacer member 64. When the outer cap member 20 is rotated with respect to the inner cap member 30 for opening the closure member, the lifting hooks 66 can move within circumferential grooves 33 on the inner cap member 30. As mentioned above, during this rotation, the outer cap member 20 is raised with respect to the inner cap member 20 by virtue of the dogs 37 that slide in the threaded recesses on the inner side of side wall 22 of the outer cap member 20. This means that also the lifting hooks rise with respect to the inner cap member 30, and thus push the spacer member 64 in cavity 65 upward.

This brings the spacer member 64 to abut from below against the inclined surfaces 67 of cavity 65 (FIG. 2*b*), which spread the spacer member 64 so that it can pass over the peripheral edges of the top wall 31 of the lower cap member 30 and come to lie on the top surface of top wall 31 (FIG. 2*c*). Even when the outer cap member 20 is now rotated back, since there is no hook or corresponding element that could push down and widen the spacer member 64, and since the upper surface of the top wall 31 where the spacer member 64 lies is flat and not inclined, it is not possible to bring the spacer member 64 back into the cavity 65, so that the spacer member permanently distances the top wall 21 of the outer cap member 20 from the top wall 31 of the inner cap member 30. In other words, when the spacer member 64 is in the second arrangement, i.e., when the spacer member 64 is placed between the top walls 21 and 31, it functions as a spacer which impedes the top wall 21 of the outer cap member 20 to return back in the original position of the first configuration. In this way, the electrical capacitance of the closure element 10 cannot return back to the original value of the first (closed) configuration. Therefore, if the closure element 10 is opened (switched from the first to the second configuration), the capacitance is permanently changed, and by reading out the transponder of the closure element 10 it is possible to ascertain whether such switching of configuration—and thus an attempt to open the closure—has occurred.

Figure 3A:
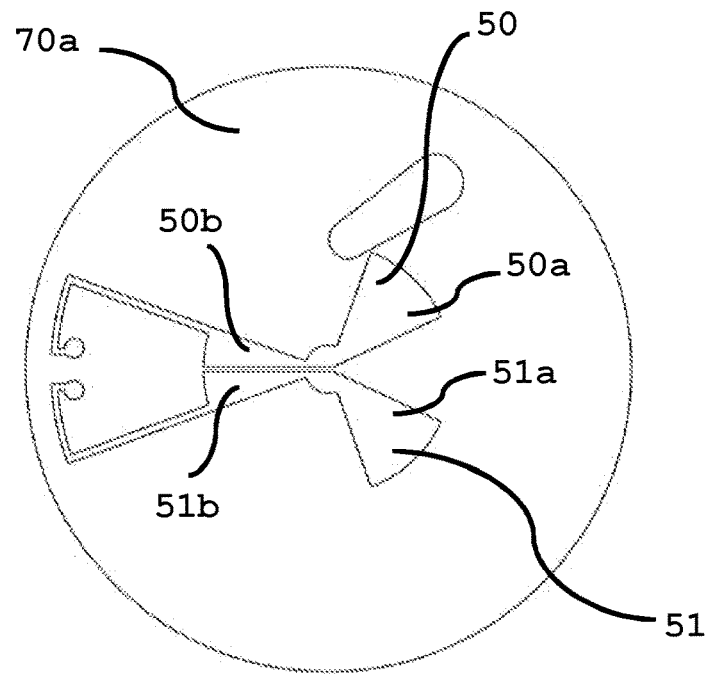
FIGS. 3a and 3b represent plan views of a third embodiment of the closure element according to the invention.
Figure 3B:
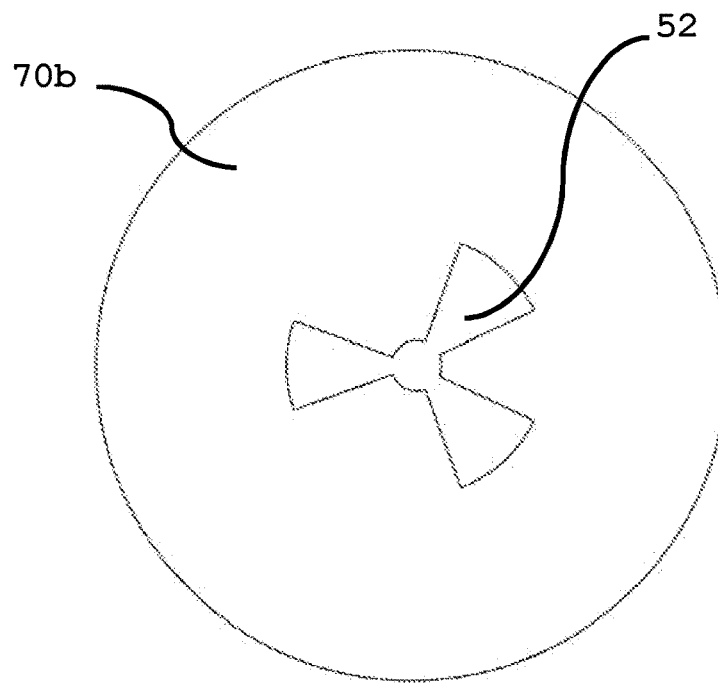

A third embodiment is disclosed with reference to FIGS. 3*a* and 3*b*. As in the first and second embodiments, in first configuration (i.e., the closed configuration), the first capacitor plates 50, 51 and the second capacitor plate 52 are disposed in a first relative position and, in the second configuration (i.e., the opened configuration), the first capacitor plates 50, 51 and the second capacitor plate 52 are disposed in a second relative position which is different from the first one.

The outer cap member and the inner cap member (not represented in FIGS. 3*a* to 3*d*) are rotatably coupled. Therefore, the switching from the closed configuration to the opened configuration is realized by rotating the outer cap member with respect to the inner cap member.

In this embodiment, the chip and the antenna of the transponder (not shown) are placed on a first support 70*a* (FIG. 3*a*). The first support 70*a* is fixed to the top wall of the inner cap member, for example by means of an adhesive layer. The first support 70*a* is a flat element, preferably but not exclusively having a round or circular shape.

Figure 3C:
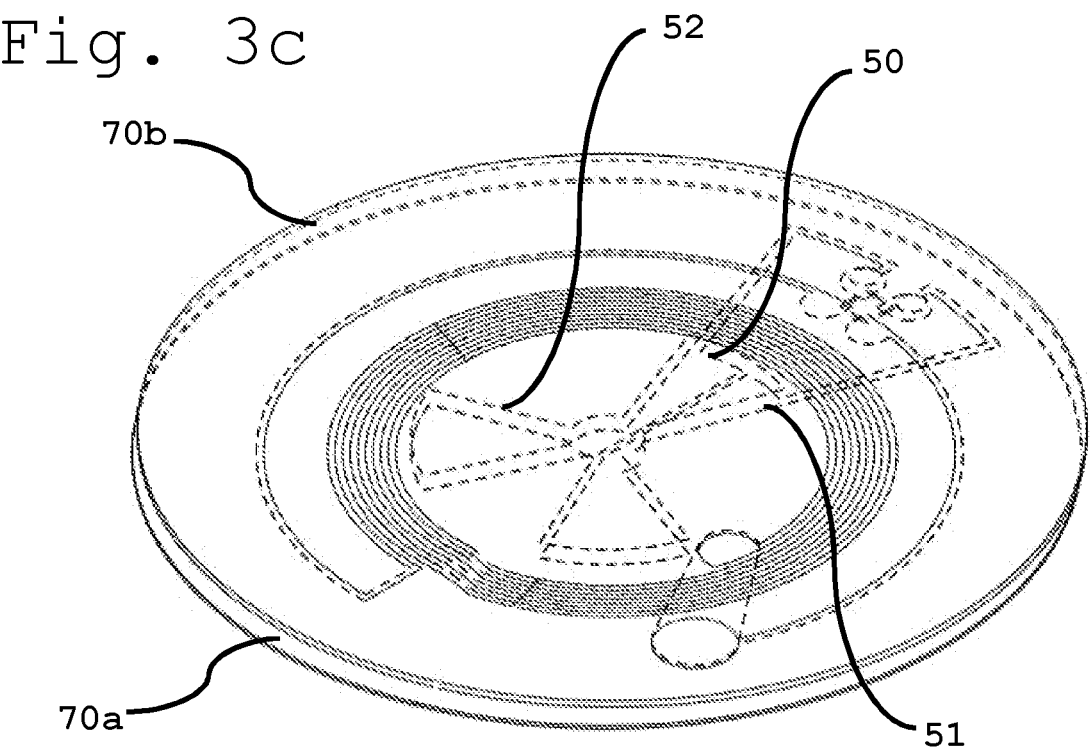
FIGS. 3c and 3d show perspective views of the third embodiment in two different configurations.

The antenna is arranged in such a way as to lie in an O-shaped area; in the example shown in FIGS. 3*c* and *d*, the antenna is substantially shaped like a circular ring. In addition, the first capacitor plates 50, 51 are placed on the first support 70*a*.

In accordance with this embodiment, the first capacitor plates 50, 51 are placed inside the ring-shaped antenna. The second capacitor plate 52 is placed on a second support 70*b* (FIG. 3*b*). The second support 70*b* is fixed to the top wall of the outer cap member, for example by means of an adhesive layer. The second support 70*b* is a flat element, preferably but not exclusively having a round or circular shape.

Each of the first capacitor plates 50, 51 comprises at least a first portion 50*a*, 51*a*.

Each first portion 50*a*, 51*a* is shaped as a circular sector. Preferably, each of the sector-shaped first portion 50*a*, 51*a* of the capacitor plates 50, 51 is centred at the geometrical centre of the top wall of the inner cap member, i.e. the centre of the circle from which the sector-shaped portions arise coincides with the geometrical centre of the top wall.

For example, the circular sector defined by each first portion 50*a*, 51*a* subtends an angle of 25° to 35°. The angle is preferably substantially 30°.

The first portions 50*a*, 51*a* of the first capacitor plates 50, 51 are next to each other on the same plane. In this way, for example, they both lie in a circular-sector-shaped area defining an angle of 50° to 70°. Preferably, the angle defined by both the first capacitor plates 50, 51, in combination, is substantially 60°.

In accordance with the third embodiment, each first capacitor plates 50, 51 further comprises a second portion 51*b*, 51*b*. Each first portion 50*a*, 51*a* is electrically connected to a corresponding second portion 50*b*, 51*b*.

Each second portion 50*b*, 51*b* is shaped as a circular sector. Each second portion 50*b*, 51*b* is arranged concentrically with the first portions 50*a*, 51*a*.

For example, each second portion 50*b*, 51*b* subtends an angle of 50° to 70°. The angle is preferably substantially 60°.

Each second portion 50*b*, 51*b* is arranged at the same angle with respect to the corresponding first portion 50*a*, 51*a*. Therefore, the first capacitor plates 50, 51 are disposed in a symmetric configuration.

However, each second portion 50*b*, 51*b* can be arranged at any angle with respect to the corresponding first portion 50*a*, 51*a*.

The first capacitor plates 50, 51 can be made of any suitable, conductive material. For example, the first capacitor plates 50, 51 are made of copper.

With particular reference to FIG. 3*b*, the second capacitor plate 52 comprises at least a portion shaped as circular-sector.

Preferably, the second capacitor plate 52 comprises a plurality of portions. According to what shown, the second capacitor plate 52 comprises three portions.

Each portion is circular-sector-shaped. Each portion of the second capacitor plate 52 subtends an angle of 50° to 70°. The angle is preferably substantially 60°.

The portions of the second capacitor plate 52 are electrically connected to each other.

In view of the above, the area of the first capacitor plates 50, 51, in combination, and the area of second capacitor plate 52 are substantially the same.

In addition, the shape of the first capacitor plates 50, 51, in combination, and the shape of second capacitor plate 52 are substantially the same. Preferably, the shape of the first capacitor plates 50, 51, in combination, matches the shape of the second capacitor plate 52.

Figure 3D:
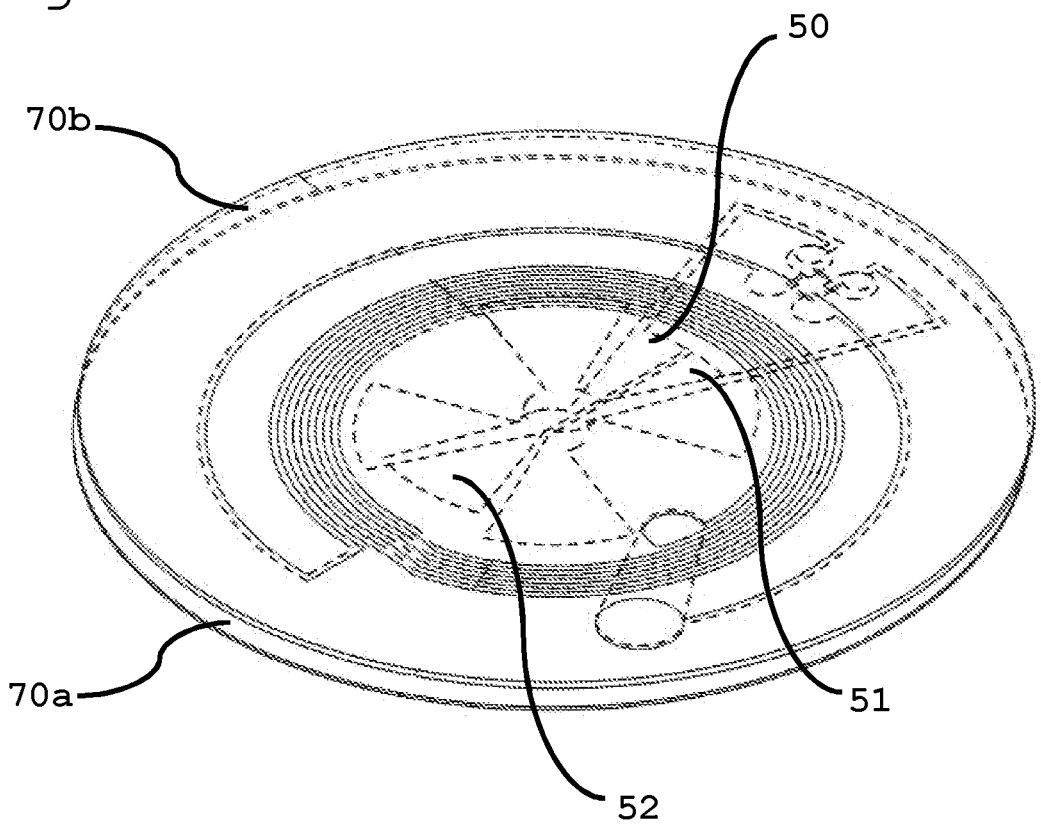

Consequently, in the first relative position, the first capacitor plates 50, 51 and the second capacitor plate 52 are overlapping (FIG. 3*c*) and, in the second relative position, the first capacitor plates 50, 51 and the second capacitor plate 52 are not overlapping (FIG. 3*d*).

The second capacitor plate 52 can be made of any suitable, conductive material. For example, the second capacitor plate 52 is made of conductive plastic.

FIGS. 4a to 4d show a fourth embodiment. In this embodiment, the chip and the antenna of the transponder (not shown) are place on a first support 70a. The first support 70a is fixed to the top wall of the inner cap member (not shown), for example by means of an adhesive layer. The antenna is arranged in such a way to lie in an O-shaped area.

Figure 4A:
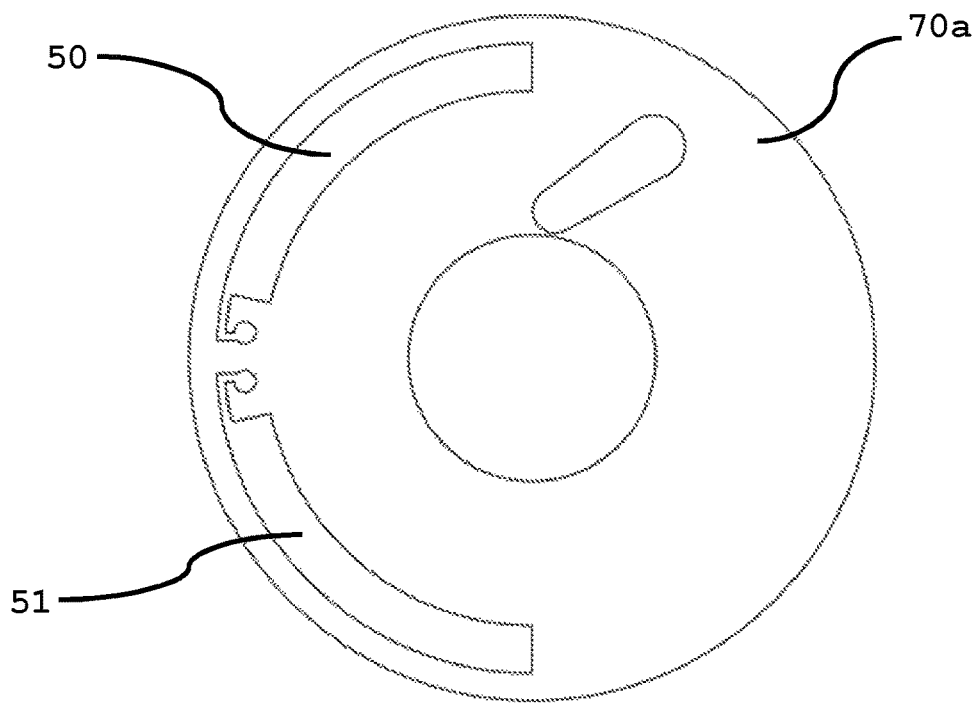
FIGS. 4a and 4b represent plan views of a fourth embodiment of the closure element according to the invention.

In addition, the first capacitor plates 50, 51 are placed on the first support 70a (FIG. 4a).

In accordance with this embodiment, the first capacitor plates 50, 51 are placed in an outer position with respect to the antenna.

The first support 70a is a flat element, preferably but not exclusively, round-shaped.

Figure 4B:
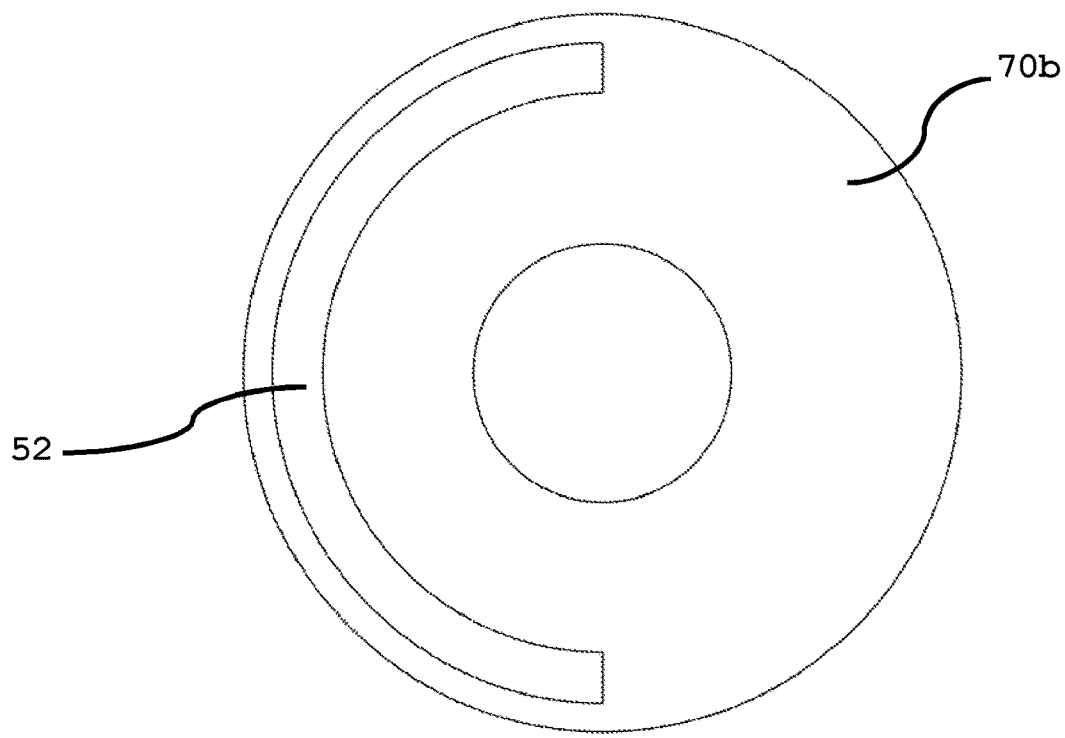
Figure 4C:
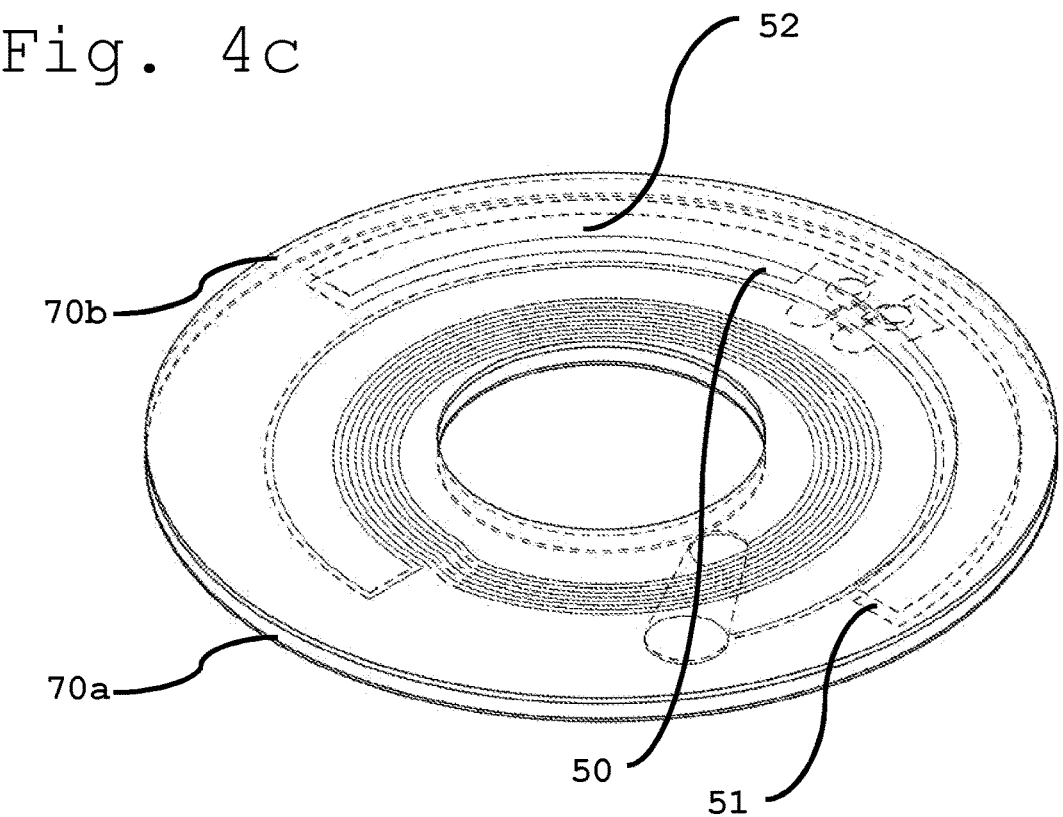
FIGS. 4c and 4d show perspective views of the fourth embodiment in two different configurations.
Figure 4D:
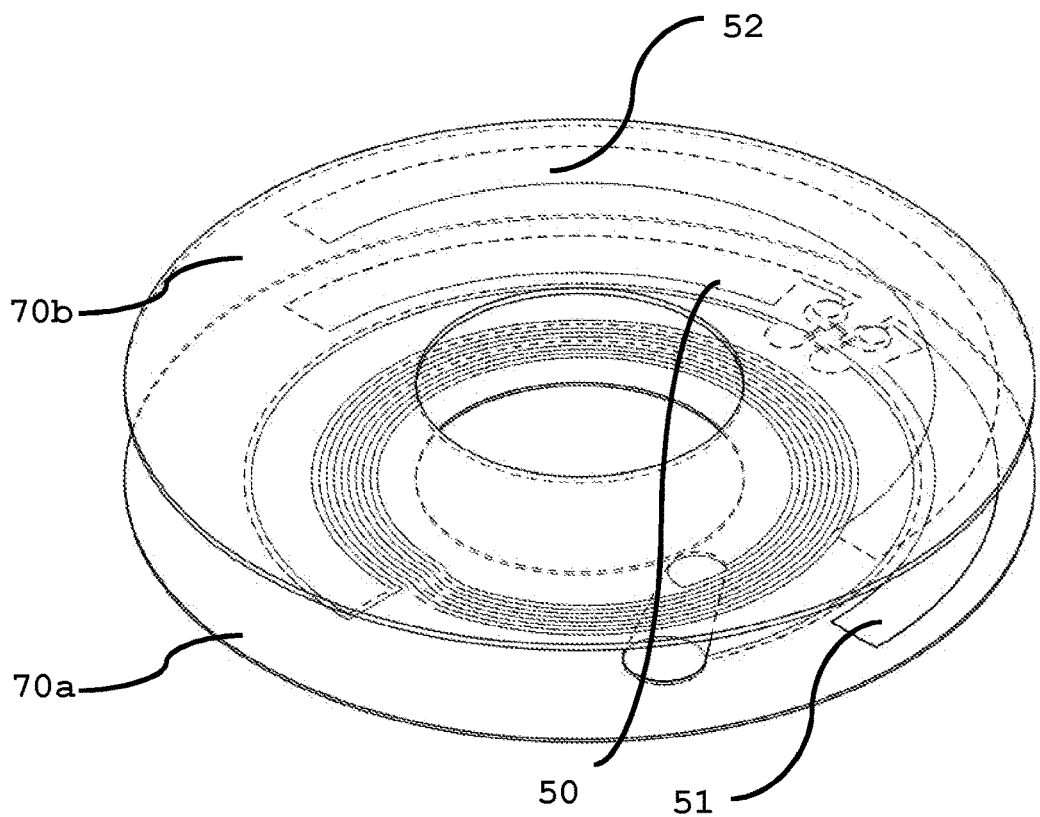

The second capacitor plate 52 is placed on a second support 70b (FIG. 4b). The second support 70b is fixed to the top wall of the outer cap member (not shown), for example by means of an adhesive layer. The second support 70b is a flat element, preferably but not exclusively, round-shaped.

Each of the first capacitor plates 50, 51 are shaped as an arcuate strip. The first capacitor plates 50, 51 are placed at a peripheral region of the first support 70a aligned one next to the other to define an arc of circumference.

In addition, the first capacitor plates 50, 51 are preferably arranged in a concentric position with reference to a centre of the first support 70a.

Each of the first capacitor plates 50, 51 defines an angle of 80° to 100°. For example, the angle defined by each of the first capacitor plates 50, 51 is 90°.

The second capacitor plate 52 is shaped as an arcuate strip. The second capacitor plate 52 is placed at a peripheral region of the second support 70b.

In addition, the second capacitor plate 52 is preferably arranged in a concentric position with reference to a centre of the second support 70b.

The second capacitor plate 52 defines an angle of 160° to 200°. For example, the angle defined by the second capacitor plate 52 is 180°.

At least in the first (closed) configuration (see FIG. 4c), the second capacitor plate 52 is overlapping both the first capacitor plates 50, 51 at a first distance.

According to the fourth embodiment, in the second (opened) configuration (FIG. 4d), the second capacitor plate 52 is still overlapping both the first capacitor plates 50, 51, but at a second distance greater than the first distance.

In other words, the relative movement between the first capacitor plates 50, 51 and the second capacitor plate 52 is a linear movement along the longitudinal direction.

Figure 5A:
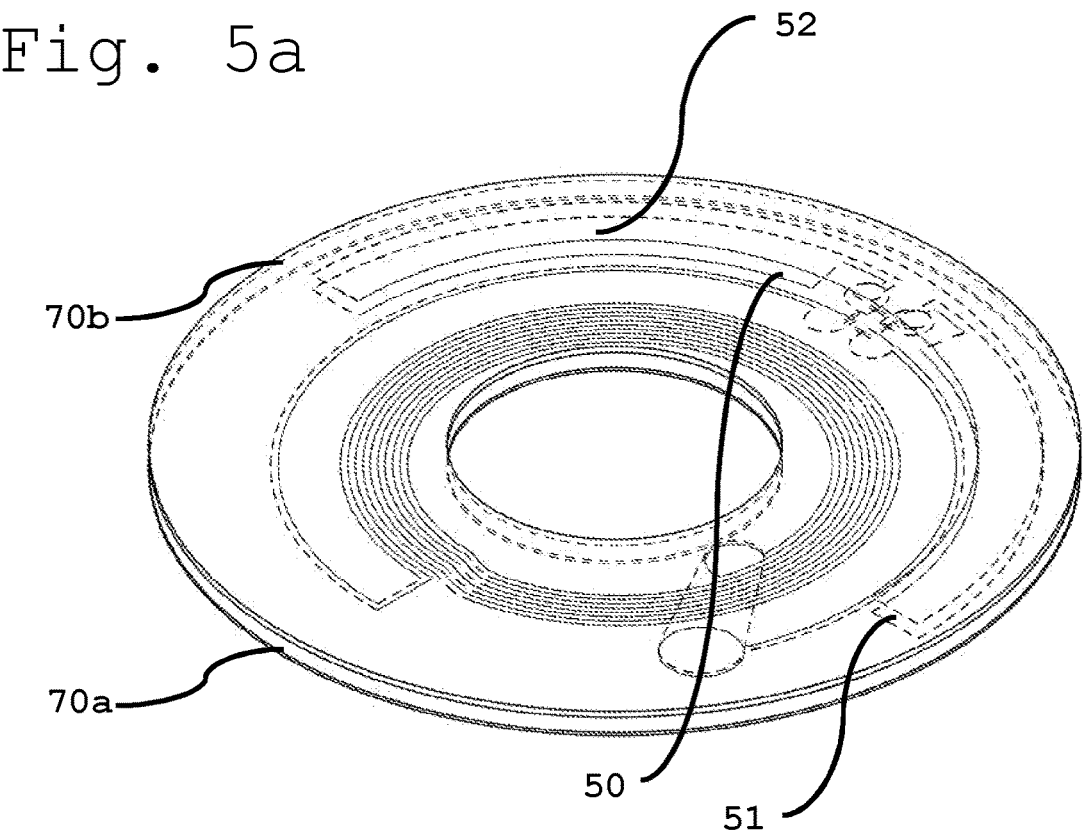
FIGS. 5a and 5b represent perspective views of a fifth embodiment of the closure element according to the invention in two different configurations.
Figure 5B:
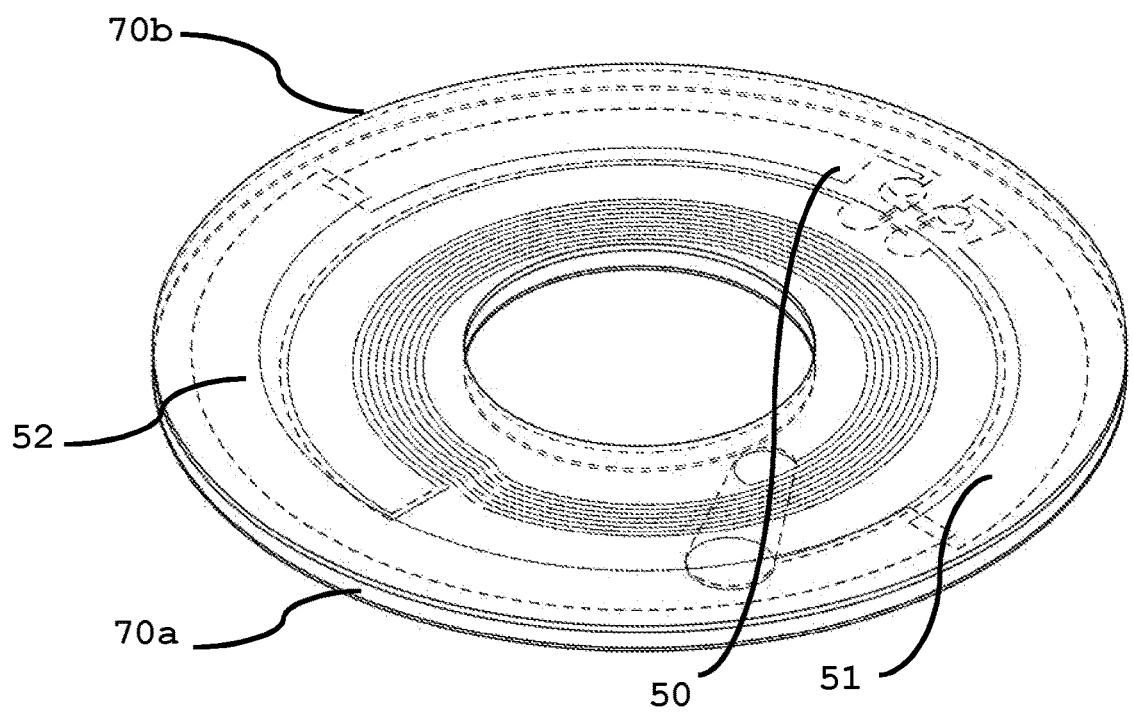
Figure 6A:
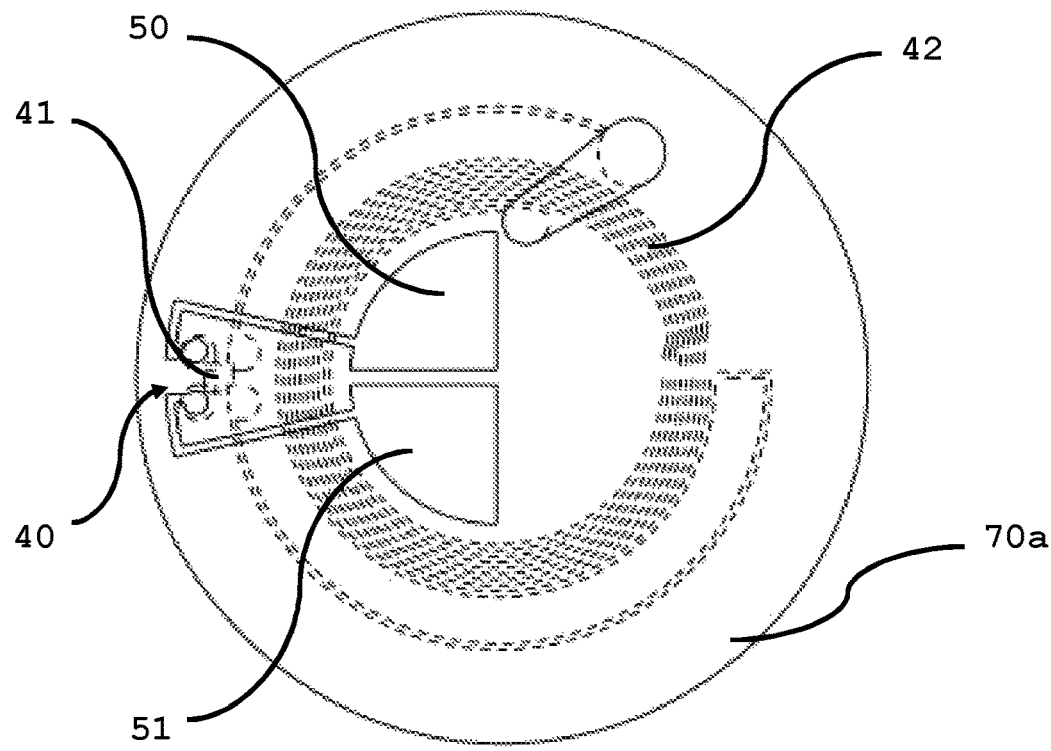
FIGS. 6a and 6b represent plan views of a sixth embodiment of the closure element according to the invention.
Figure 6B:
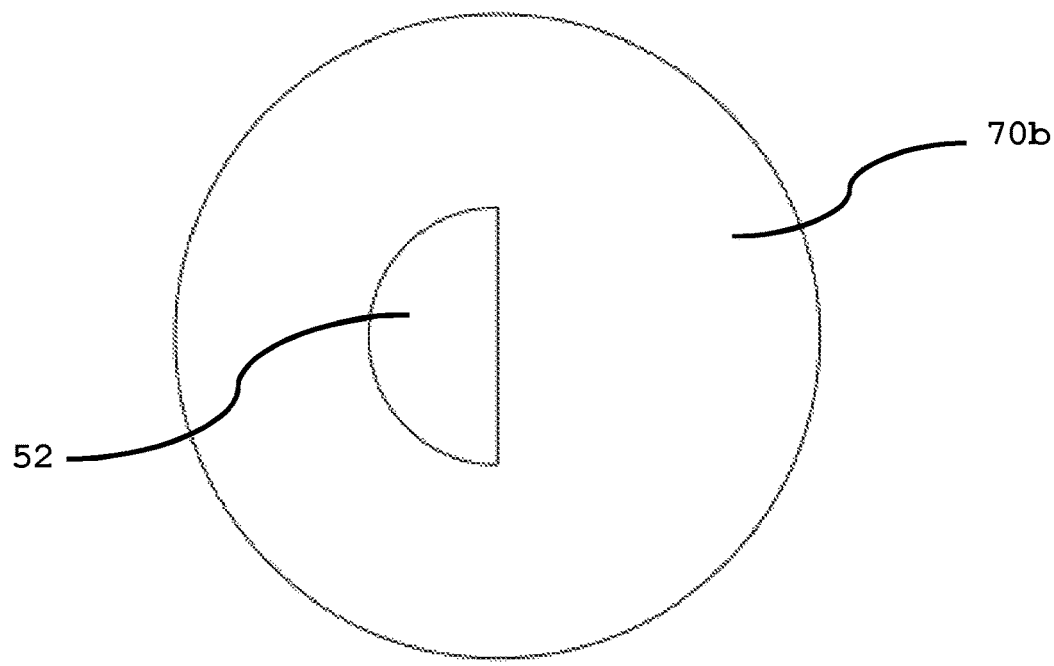
Figure 6C:
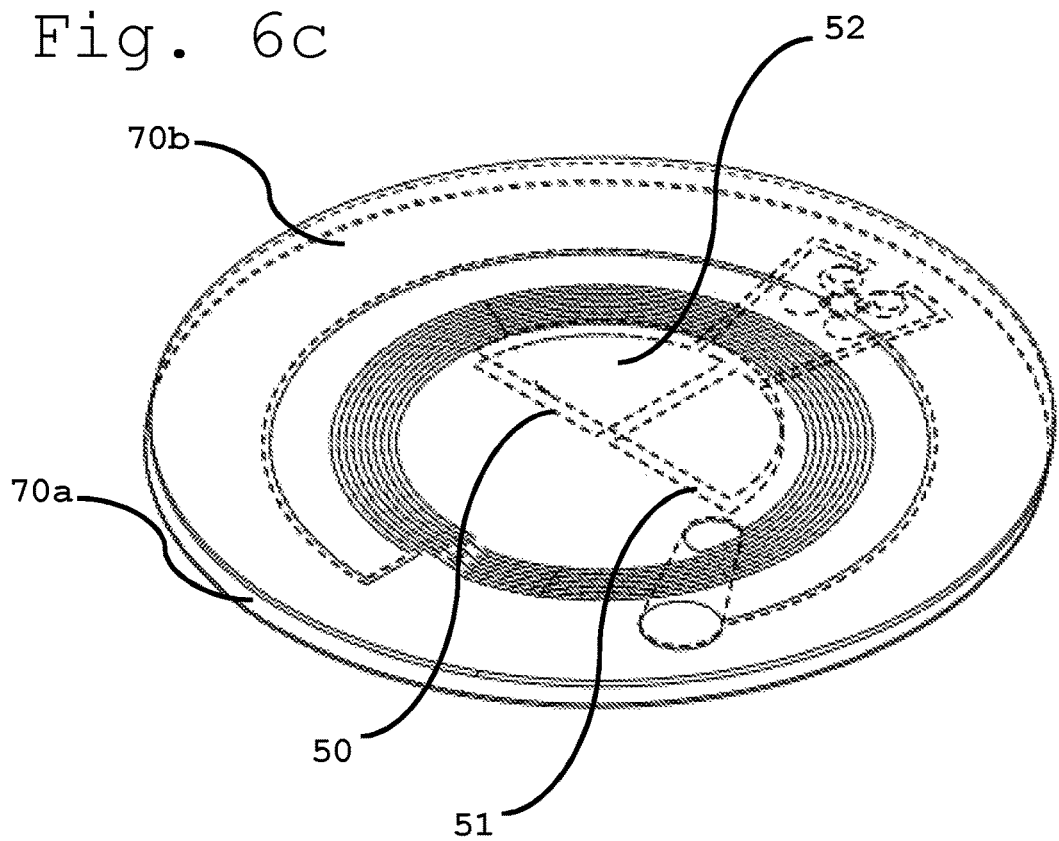
FIGS. 6c and 6d show perspective views of the sixth embodiment in two different configurations.
Figure 6D:
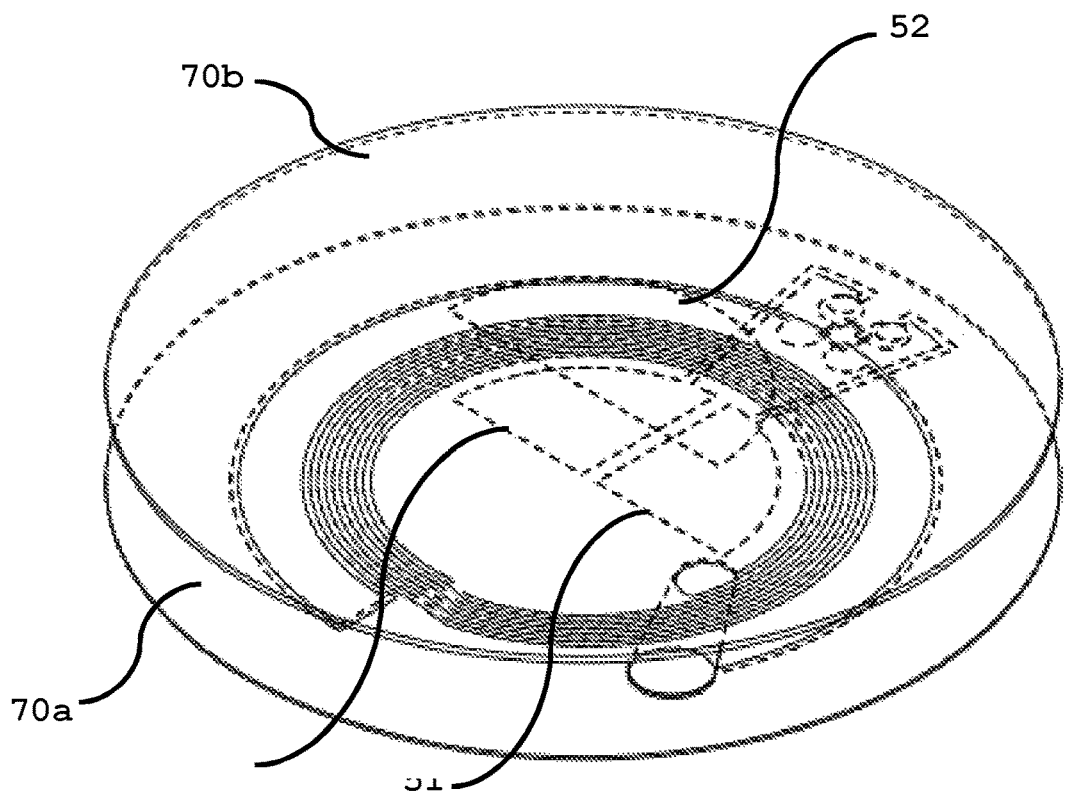

FIGS. 5a and 5b represent a fifth embodiment. The closure element 10 of this embodiment is structurally similar to that of the fourth embodiment.

However, in the fifth embodiment the relative movement between the first capacitor plates 50, 51 and the second capacitor plate 52 is a rotational movement.

In other words, in the first (closed) configuration (see FIG. 5a), the second capacitor plate 52 is overlapping both the first capacitor plates 50, 51. In the second (opened) configuration (see FIG. 5b), the second capacitor plate 52 is placed in a different rotational position, not overlapping the first capacitor plates 50, 51.

FIGS. 6a to 6d disclose a sixth embodiment. In this embodiment, the chip and the antenna of the transponder (not shown) are place on a first support 70a. The first support 70a is fixed to the top wall of the inner cap member (not shown), for example by means of an adhesive layer. The antenna is arranged in such a way to lie in an O-shaped area.

In addition, the first capacitor plates 50, 51 are placed on the first support 70a.

In accordance with this embodiment, the first capacitor plates 50, 51 are placed in an inner position with respect to the antenna.

The first support 70a is a flat element, preferably but not exclusively, round-shaped.

The second capacitor plate 52 is placed on a second support 70b. The second support 70b is fixed to the top wall of the outer cap member (not shown), for example by means of an adhesive layer. The second support 70b is a flat element, preferably but not exclusively, round-shaped.

Each of the first capacitor plates 50, 51 are shaped as a circular sector. Each of the first capacitor plates 50, 51 is arranged so that their centre coincide with a centre of the first support 70a.

Each of the first capacitor plates 50, 51 defines an angle of 80° to 100°. For example, the angle defined by each of the first capacitor plates 50, 51 is 90°. The first capacitor plates 50, 51 are places one next to the other in such a way to lie on a semicircle area.

The second capacitor plate 52 is shaped as a circular second. The second capacitor plate 52 is arranged so that its centre coincides with a centre of the second support 70b.

The second capacitor plate 52 defines an angle of 160° to 200°. For example, the angle defined by the second capacitor plate 52 is 180°. Therefore, the second capacitor plate 52 lies on a semicircle area.

At least in the first (closed) configuration (see FIG. 6c), the second capacitor plate 52 is overlapping both the first capacitor plates 50, 51 at a first distance.

According to the sixth embodiment, in the second (opened) configuration (see FIG. 6d), the second capacitor plate 52 is still overlapping both the first capacitor plates 50, 51, but at a second distance greater than the first distance.

In other words, the relative movement between the first capacitor plates 50, 51 and the second capacitor plate 52 is a linear movement along the longitudinal direction.

Figure 7A:
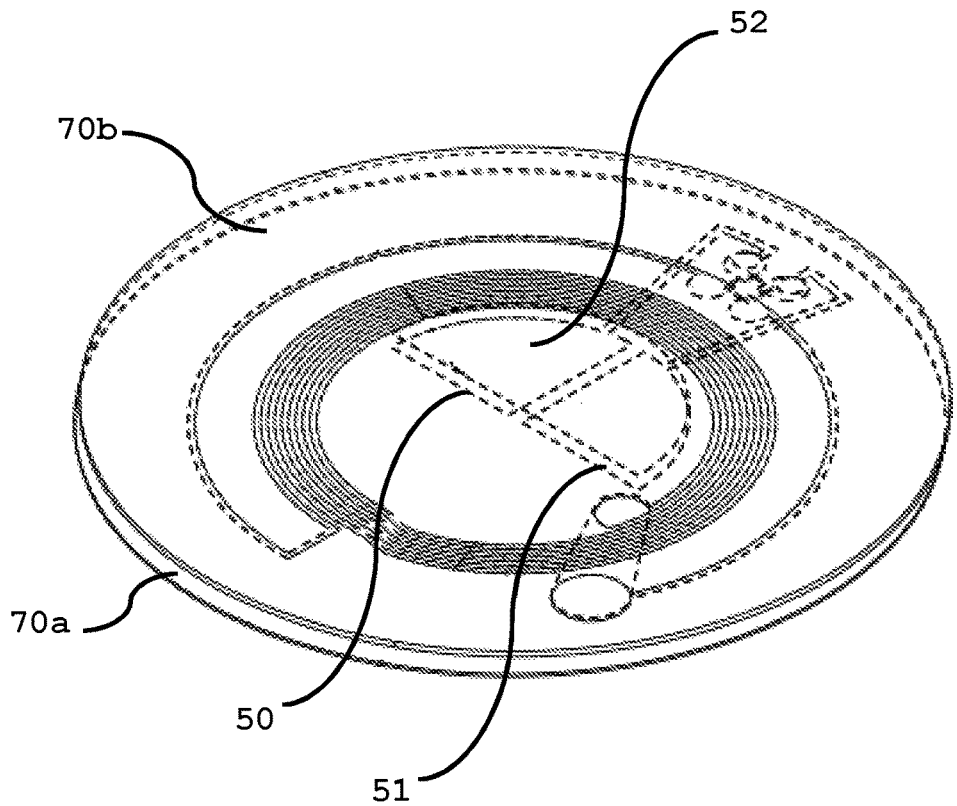
FIGS. 7a and 7b represent perspective views of a seventh embodiment of the closure element according to the invention in two different configurations.
Figure 7B:
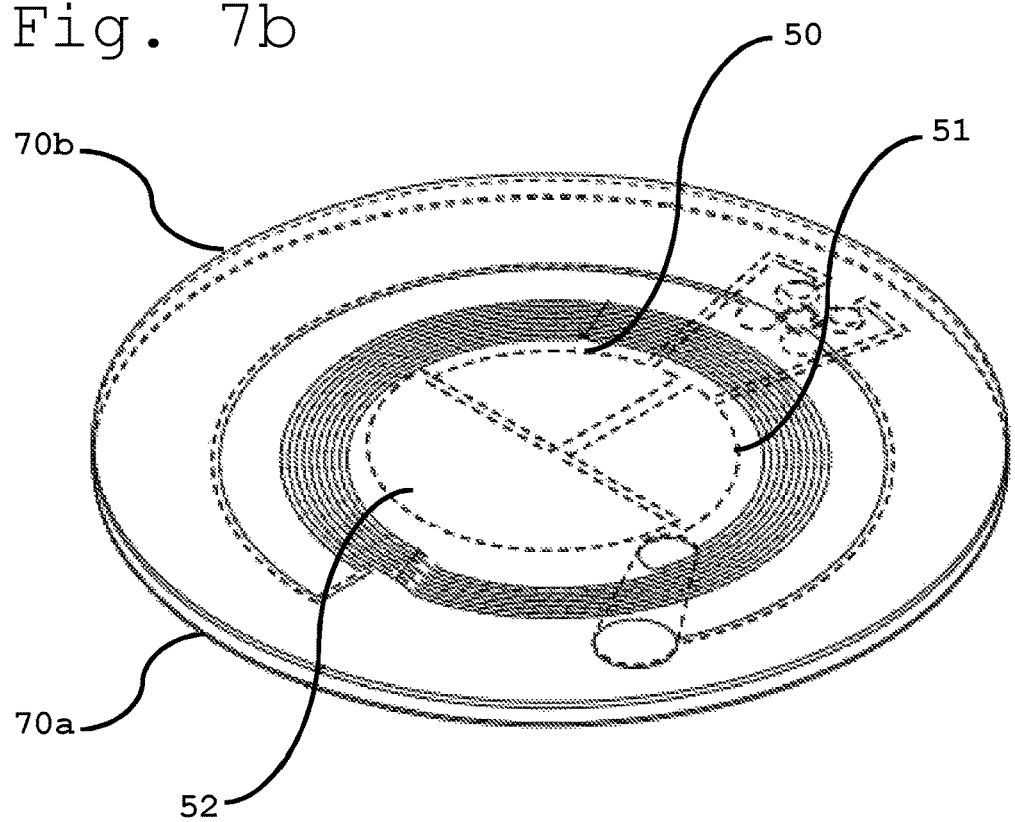

FIGS. 7a and 7b show a seventh embodiment. The closure element 10 of this embodiment is structurally similar to that of the sixth embodiment.

However, in the seventh embodiment the relative movement between the first capacitor plates 50, 51 and the second capacitor plate 52 is a rotational movement.

In other words, in the first (closed) configuration (see FIG. 7a), the second capacitor plate 52 is overlapping both the first capacitor plates 50, 51. In the second (opened) configuration (see FIG. 7b), the second capacitor plate 52 is placed in a different angular position, not overlapping the first capacitor plates 50, 51.

Figure 8A:
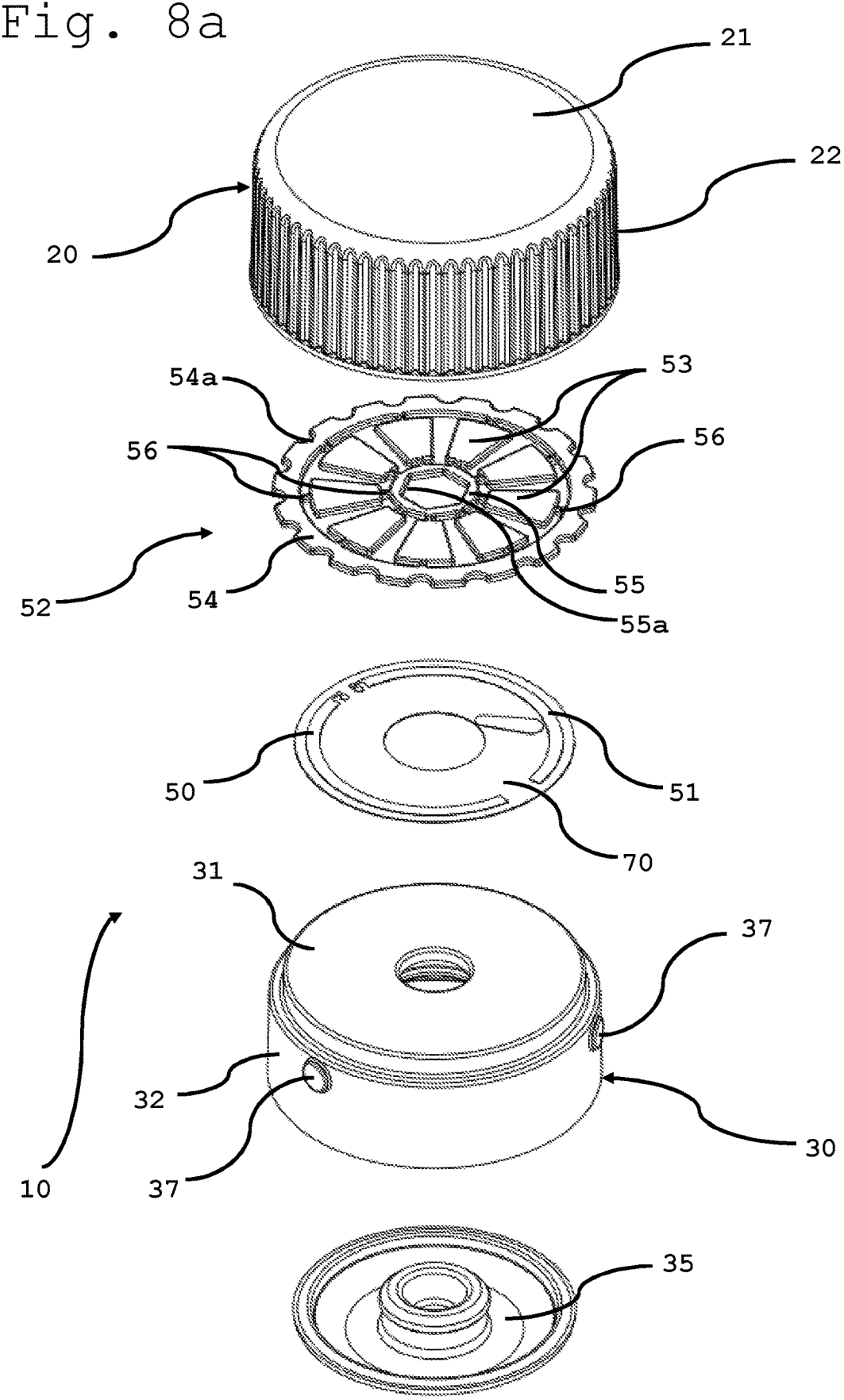
FIGS. 8a and 8b are exploded views according a first and a second view direction, respectively, of an eighth embodiment of the closure element according to the invention.
Figure 8B:
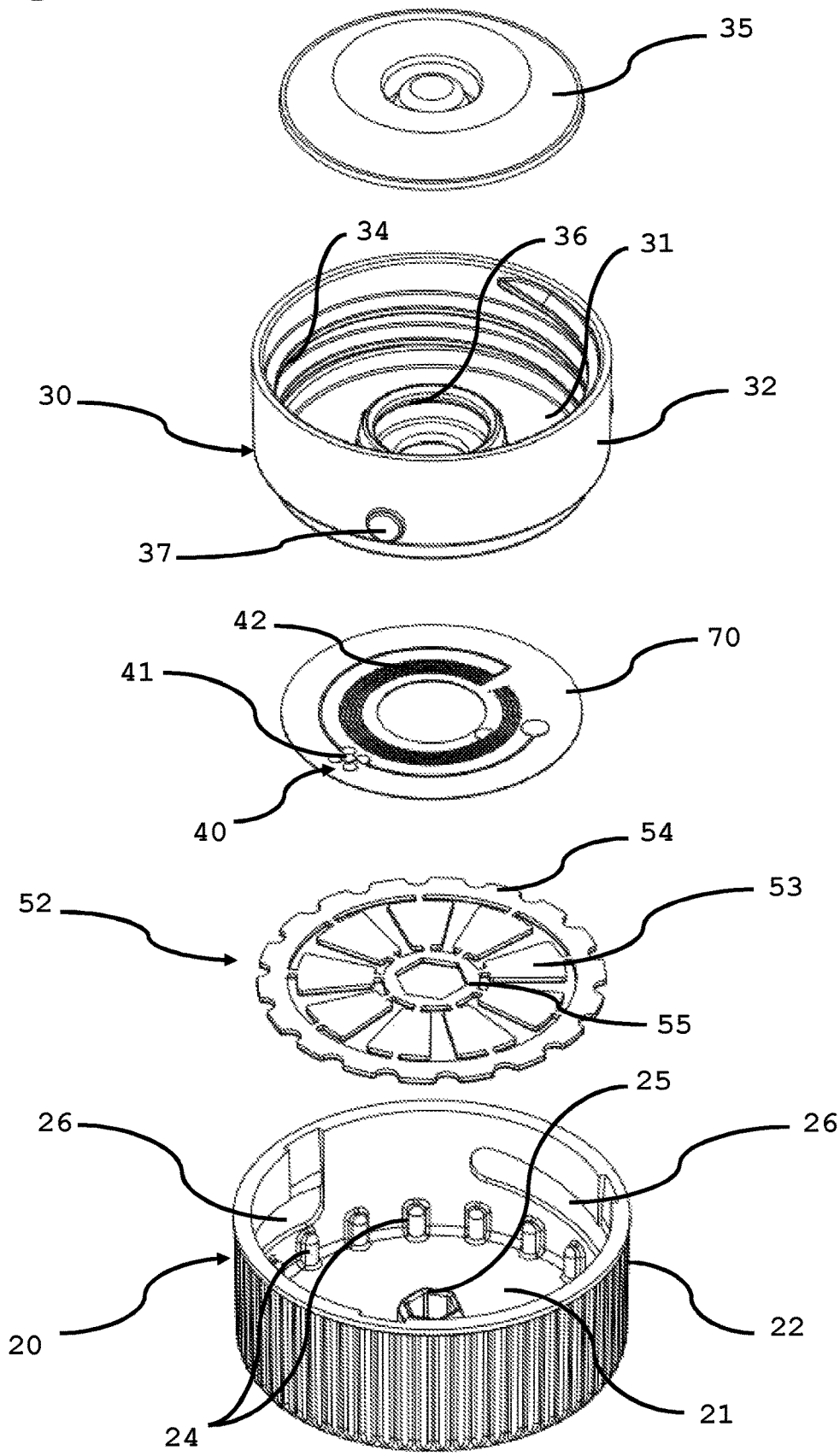

In FIGS. 8a and 8b, an eighth embodiment is disclosed.

In line with the preceding embodiments, the closure element 10 comprises the two first capacitor plates 50, 51 connected to the chip 41 of the transponder 40.

The chip 41 and the antenna 42 of the transponder 40 and the first capacitor plates 50, 51 are placed on a substrate 70 which is attached to the top wall 31 of the inner cap member 30 by means of an adhesive layer.

In detail, the first capacitor plates 50, 51 are arranged on a first surface of the substrate 70 facing the top wall 21 of the outer cap member 20 (see FIG. 8a).

The chip 41 and the antenna 42 of the transponder 40 are arranged on a second surface of the substrate 70 facing the top wall 31 of the inner cap member 30 (see FIG. 8b).

The first capacitor plates 50, 51 are shaped as curved strips arranged on a peripheral portion of the first surface of the support 70.

In addition, the second capacitor plate 52 comprises a plurality of sections 53 arranged along a circumferential direction. The sections 53 are configured to be electrically connected to each other in the first configuration (i.e., closed configuration) and electrically disconnected in second configuration (opened configuration).

In detail, the second capacitor plate 52 comprises a first ring 54 and a second ring 55. The first ring 54 has a diameter greater than the diameter of the second ring 55.

The sections 53 are connected between the first ring 54 and the second ring 55 on the same plane.

In particular, the sections 53 are connected to the first ring 54 and second ring 55 by means of breakable bridges 56.

The first ring 54 and the second ring 55 are connected to the outer cap member 20.

All the sections 53 have the same shape and the same dimension. In detail, the sections 53 are trapezoidal-shaped and angularly evenly spaced.

The first ring 54 presents an external edge 54a opposed to an edge connecting the sections 53.

The external edge 54a is shaped such that the first ring 54 is fastened to the outer cap member 20 in such a way that they rotate together.

In this regard, the external edge 54a is indented. The indented, external edge 54a of the first ring 54 is housed in a corresponding, counter-shaped indentation 24 (see FIG. 8b) arranged internally in the outer cap member 20. Therefore, the first ring 54 is fastened to the outer cap member 20.

An internal edge 55a of the inner ring 55 is opposite to an edge of the inner ring 55 connecting the sections 53.

The internal edge 55a is shaped such that the second ring 55 is fastened to the outer cap member 20 in such a way that they rotate together.

In this regard, the internal edge 55a of the inner ring 55 presents a polygonal shape. The internal edge 55a is fitted onto a counter-shaped coupling protuberance 25 projecting from the top wall 21 of the outer cap member 20.

The sections 53 of the second capacitor plate 52 are fixed to the substrate 70 by means of an adhesive layer.

According to this configuration, when the outer cap member 20 is rotated with respect to the inner cap member 30, a relative rotation between the first and second rings 54, 55 and the support 70 is determined. In other words, as the support 70 is fixed to the top wall 31 of the inner cap member 30, a relative rotation is determined between the rings 54, 55 and the sectors 53.

This relative rotation determines a breakage of the breakable bridges 56. In this way, at least part of the sections 53 of the second capacitor plate 52 are electrically disconnected from each other. Preferably, all the sections 53 of the second capacitor plate 52 are electrically disconnected from each other.

Therefore, the shape of the second capacitor plate 52 changes from a first shape to a second shape, which is different from the first one, when switching from the first configuration to the second configuration. Accordingly, the electrical capacitance of the capacitor defined by the first capacitor plates 50, 51 and the second capacitor plate 52 is modified to detect a change in the configuration of the closure element 10.

The closure element 10 of the eighth embodiment further comprises the blocking means in line with the other embodiments described above.

In addition, the closure element 10 according to the eighth embodiment comprises lifting means operatively place between the outer cap member 20 and the inner cap member 30 to lift the outer cap member 20 with reference to the inner cap member 30 when the closure element 1ß is switched from the first (closed) configuration to the second (opened) configuration.

In this regard, the lifting means comprises at least one dog 37 protruding from the side wall 31 of the inner cap member 30. Preferably, the lifting means comprises a plurality of dogs 37. In the disclosed embodiment, the listing means comprises two dogs 37 arranged on opposite positions.

The dogs 37 slide along corresponding inclined slit 26 on the inner side of side wall 22 of the outer cap member 20. These slits 26 are inclined in a way such that, when the outer cap member 20 is rotated with respect to the inner cap member 30 for opening the closure member, the outer cap member 20 is raised with respect to the inner cap member 30.

Figure 9A:
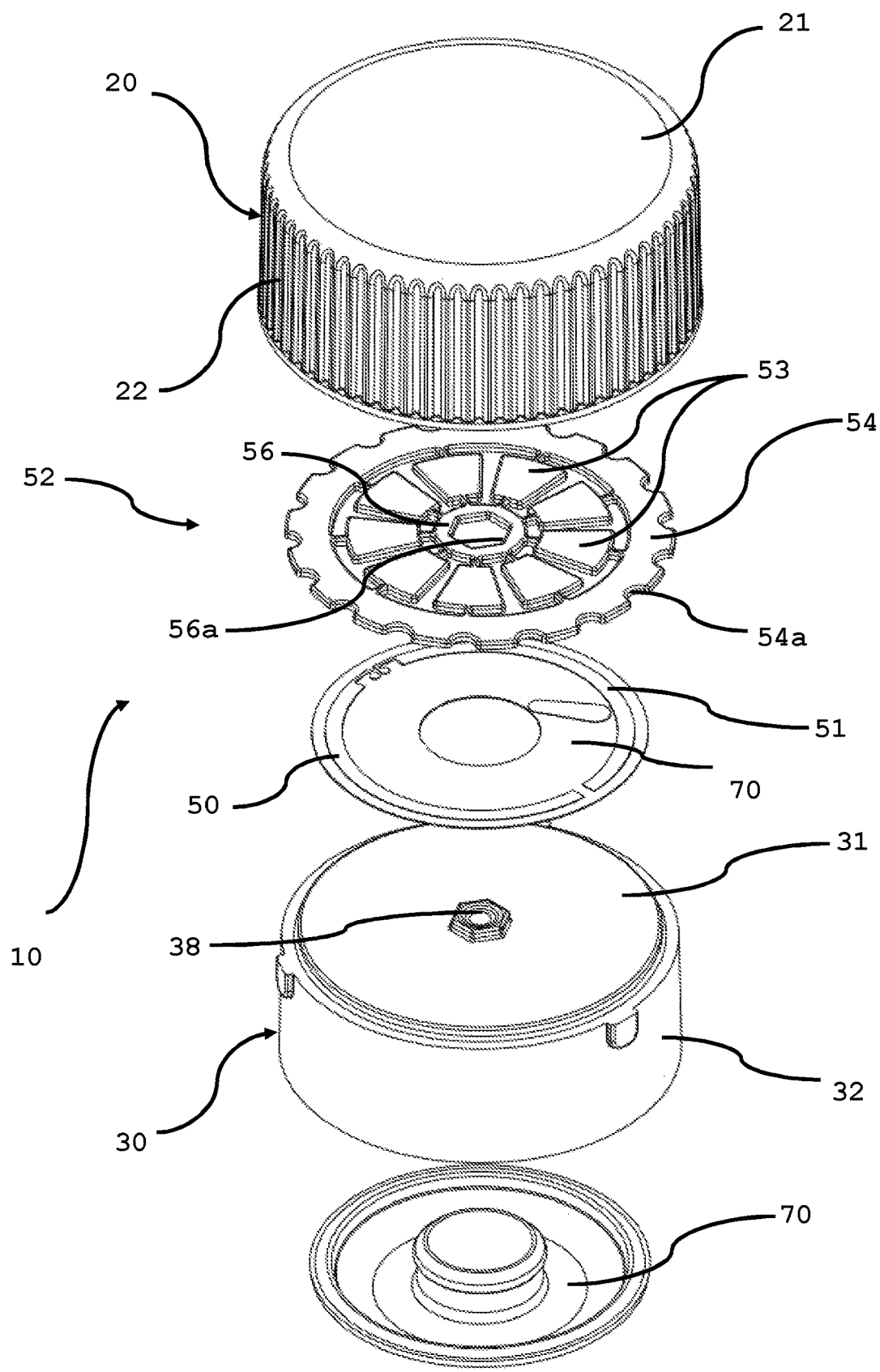
FIGS. 9a and 9b are exploded views according a first and a second view direction, respectively, of a ninth embodiment of the closure element according to the invention.
Figure 9B:
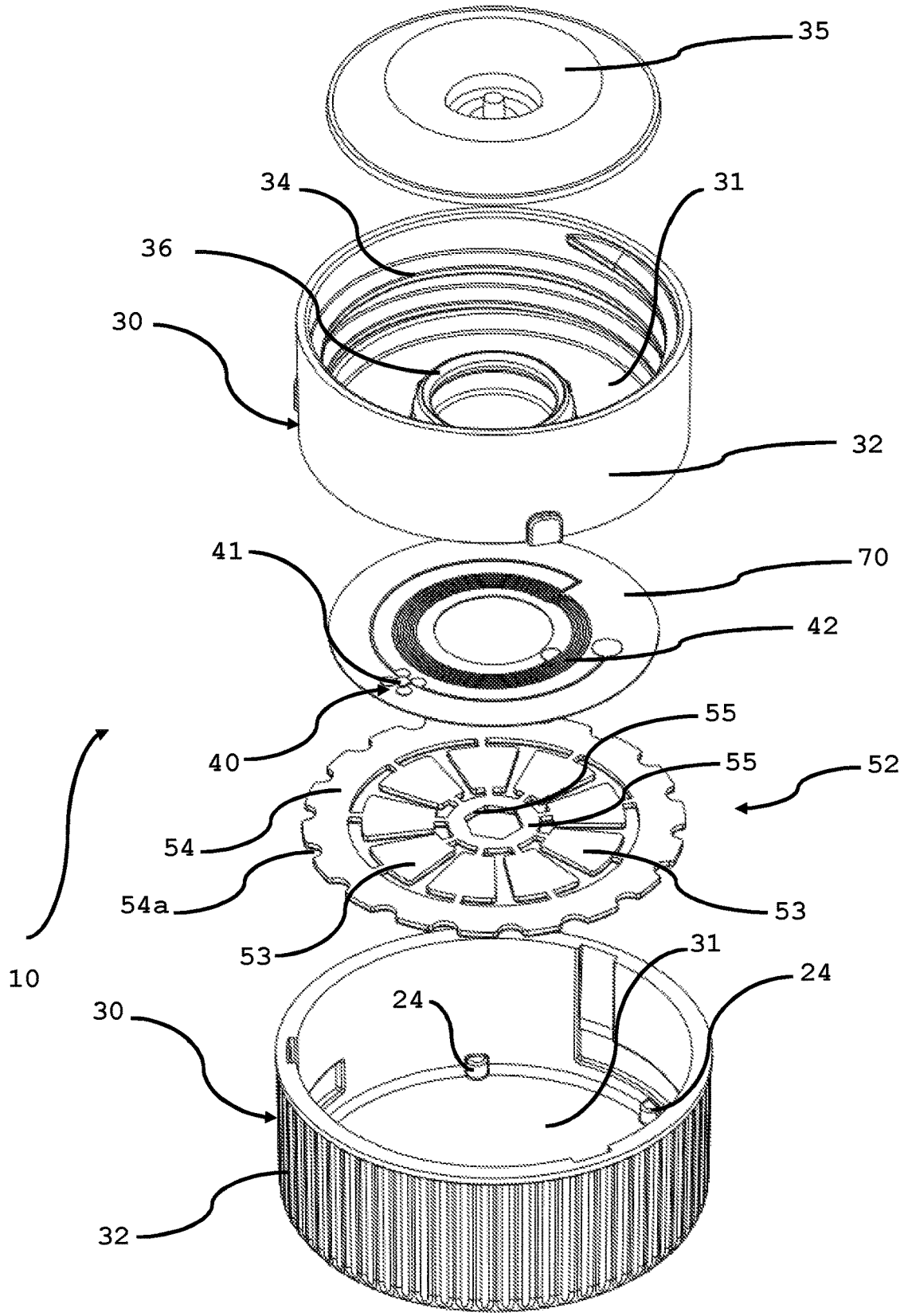

FIGS. 9a and 9b show a ninth embodiment of the closure element 10 of the present invention.

The closure element 10 of the ninth embodiment is similar to that of the eighth embodiment.

However, the second capacitor plate 52 is directly connected to both the outer cap member 20 and the inner cap member 30.

In detail, the indented, external edge 54a of the first ring 54 is housed in the corresponding, counter-shaped indentation 24 (see FIG. 9b) arranged internally in the outer cap member 20. Therefore, the first ring 54 is fastened to the outer cap member 20.

The internal edge 55a of the inner ring 55 is opposite to an edge of the inner ring 55 connecting the sections 53.

The internal edge 55a is shaped such that the second ring 55 is fastened to the outer cap member 20 in such a way that they rotate together.

In this regard, the internal edge 55a of the inner ring 55 presents a polygonal shape. The internal edge 55a is fitted onto a counter-shaped coupling protuberance 38 projecting from a central portion of the top wall 31 of the inner cap member 30.

The sections 53 of the second capacitor plate 52 are not directly fixed to the substrate 70.

According to this configuration, when the outer cap member 20 is rotated with respect to the inner cap member 30, a relative rotation between the first ring 54 and second ring 55 is determined.

This relative rotation determines a breakage of the breakable bridges 56. In this way, at least part of the sections 53 of the second capacitor plate 52 are electrically disconnected from each other. Preferably, all the sections 53 of the second capacitor plate 52 are electrically disconnected from each other.

Therefore, the shape of the second capacitor plate 52 changes from a first shape to a second shape, which is different from the first one, when switching from the first configuration to the second configuration. Accordingly, the electrical capacitance of the capacitor defined by the first capacitor plates 50, 51 and the second capacitor plate 52 is modified to detect a change in the configuration of the closure element 10.

Figure 10A:
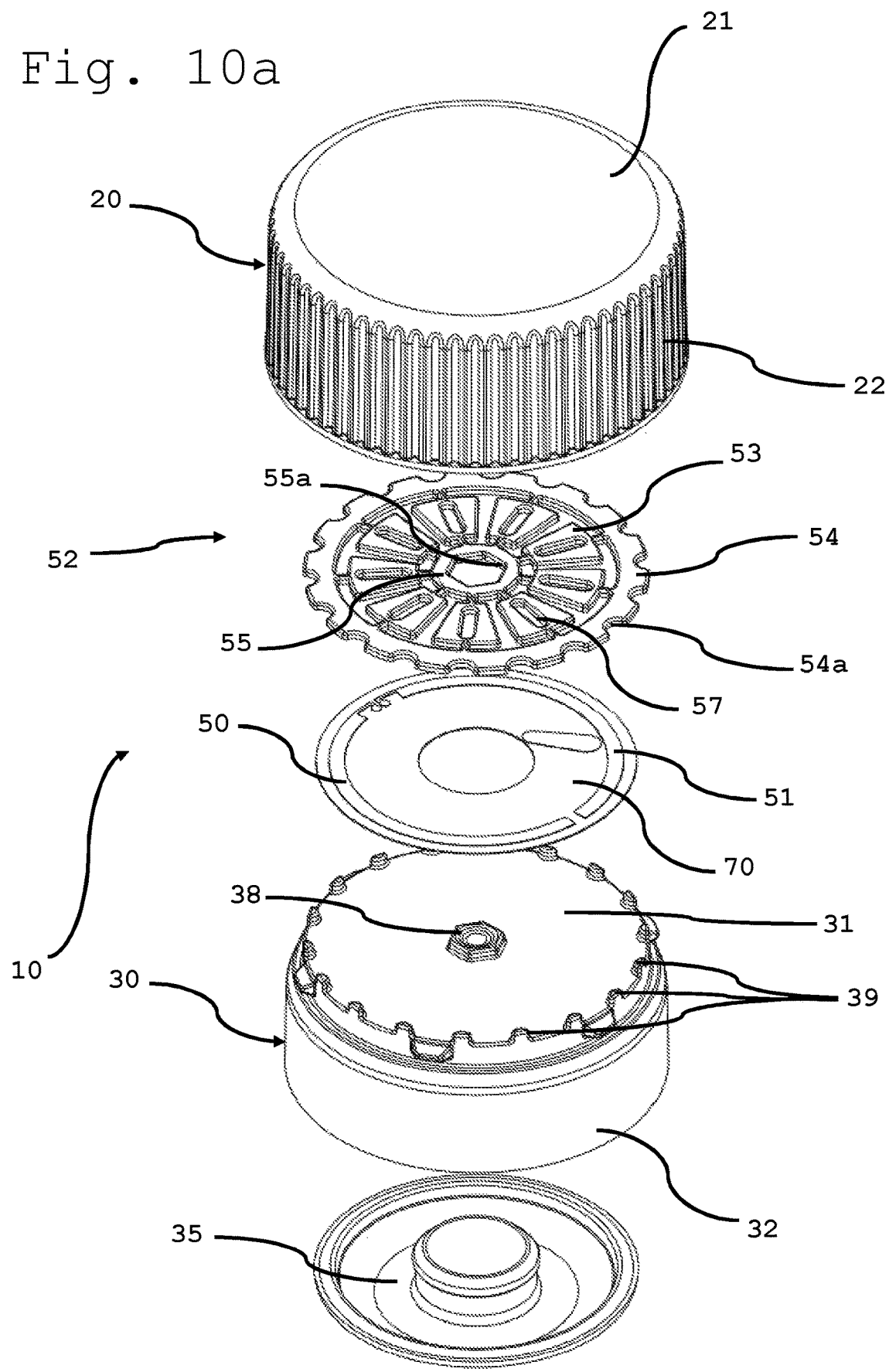
FIGS. 10a and 10b are exploded views according a first and a second view direction, respectively, of a tenth embodiment of the closure element according to the invention.
Figure 10B:
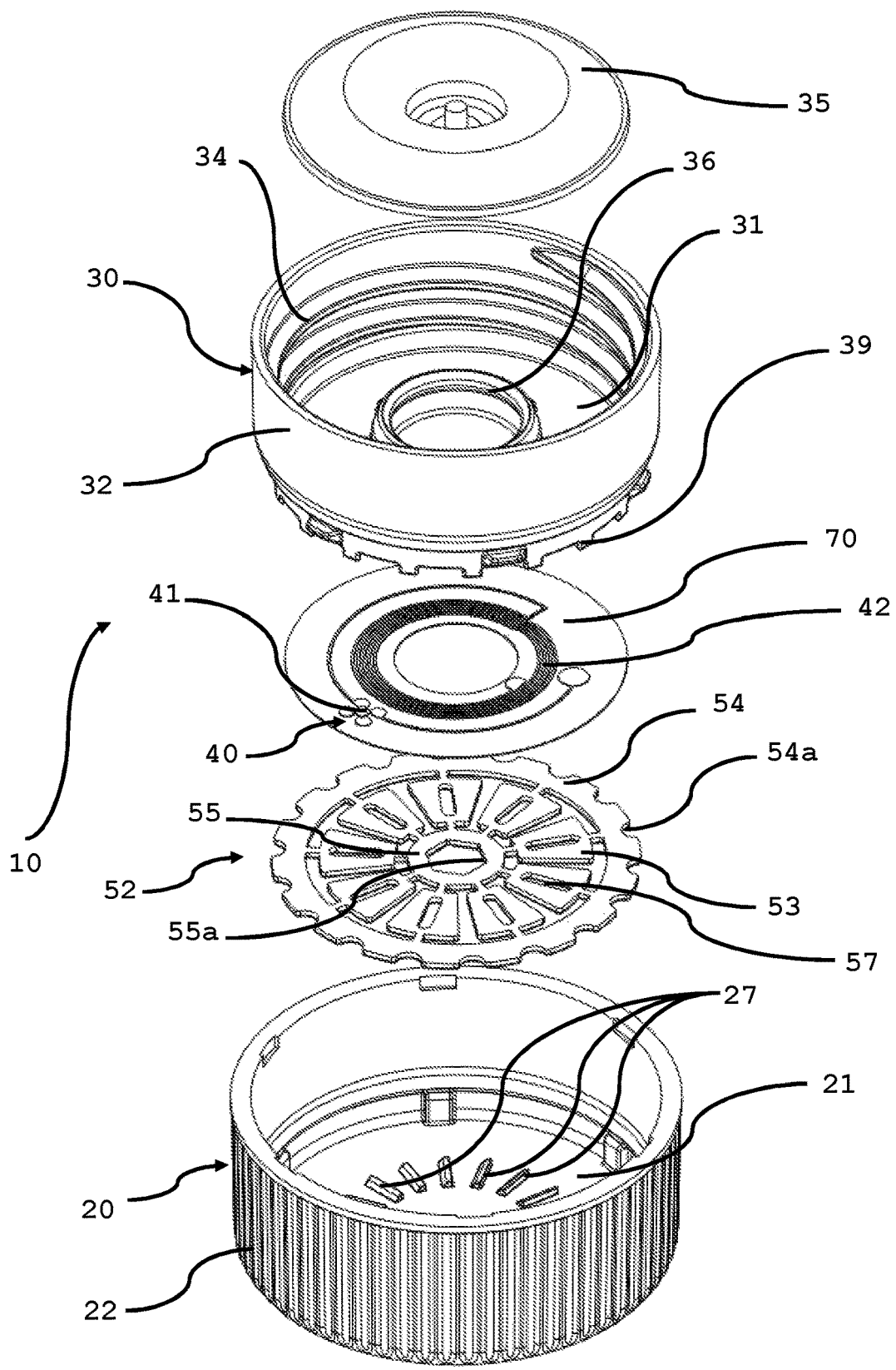

FIGS. 10a and 10b disclose a tenth embodiment of the closure elements 10 of the present invention.

The closure element 10 of this embodiment is structurally similar to that of the eighth and ninth embodiments. However, in the tenth embodiment, the connection between the second capacitor plate 52 with the outer cap member 20 and the inner cap member 30 is different.

In detail, the inner cap member 30 comprises a plurality of fixing teeth 39 protruding from the top wall 31. The fixing teeth 39 are arranged in such a way that they are at the same distance from each other.

The indented, external edge 54a of the first ring 54 of the second capacitor plate 52 is fitted with the fixing teeth 39 in such a way that the first ring is fixed to the inner cap member 30.

In addition, the inner cap member 30 further comprises the coupling protrusion 38 protruding from a central portion of the top wall 31.

The internal edge 55a of the second ring 55 of the second capacitor plate 52 is counter-shaped with the coupling protrusion 38 in such a way that the second ring 55 is fixed to the inner cap member 30.

Each sector 53 of the second capacitor plate 52 presents a centrally arranged slot 57.

In addition, the outer cap member 20 further comprises a plurality of corresponding fixing protrusions 27 protruding from the top wall 21. The fixing protrusions 27 fit into the slots 57 in such a way that the sectors 53 of the second capacitor plate 52 are fixed to the outer cap member 20.

According to this configuration, when the outer cap member 20 is rotated with respect to the inner cap member 30, a relative rotation between the first and second rings 54, 55 and the sectors 53 is determined.

This relative rotation determines a breakage of the breakable bridges 56. In this way, at least part of the sections 53 of the second capacitor plate 52 are electrically disconnected from each other. Preferably, all the sections 53 of the second capacitor plate 52 are electrically disconnected from each other.

Therefore, the shape of the second capacitor plate 52 changes from a first shape to a second shape, which is different from the first one, when switching from the first configuration to the second configuration. Accordingly, the electrical capacitance of the capacitor defined by the first capacitor plates 50, 51 and the second capacitor plate 52 is modified to detect a change in the configuration of the closure element 10.

While specific embodiments have been discussed, various modifications may of course be made, and the invention is not limited to the specific form or configuration of parts described herein, except insofar as such limitations are included in the following claims. It will be understood by the skilled person that sub-combinations are of utility and may be employed even without explicit reference to other features.

REFERENCE SIGNS

10 Closure element
20 Outer cap member
21 Top wall (of the outer cap member 20)
22 Side wall (of the outer cap member 20)
23 Teeth
24 Indentation
25 Coupling protuberance
26 Inclined slits
27 Fixing protrusions
30 Inner cap member
31 Top wall (of the inner cap member 30)
32 Side wall (of the inner cap member 30)
33 Grooves
34 Screw portion
35 Cap liner
36 Coupling protrusion
37 Dogs
38 Coupling protuberance
39 Fixing teeth
40 Transponder (RFID tag)
41 Chip
42 Antenna
50, 51 First capacitor plates
50a, 51a First portions
51b, 51b Second portions
52 Second capacitor plate
53 Sections
54 First ring
54a External edge
55 Second ring
55a Internal edge
56 Bridges
57 Slots
60 Blocking means
61 Blocking Ribs
64 Spacer member
65 Cavity
66 Lifting hooks
70 Substrate
70a First support
70b Second support
80 Lifting means
81 Lifting ribs
82 Recess

The invention claimed is:

1. Closure element for closing a container, comprising:
an inner cap member to be coupled with a mouth of the container; wherein the inner cap member has a top wall and a side wall extending from an edge of the top wall;
an outer cap member movably coupled to the inner cap member;
wherein the outer cap member has a top wall and a side wall extending from an edge of the top wall;
a transponder housed between the inner cap member and the outer cap member; the transponder comprising a chip and an antenna;
characterised in that
it further comprises at least two first capacitor plates each connected with the chip, wherein the at least two first capacitor plates are attached to one of the top wall of the inner cap member and the top wall of the outer cap member;
wherein the closure element further comprises at least a second capacitor plate attached to the other of the top wall of the inner cap member and the top wall of the outer cap member, in such a way that a relative movement of the outer cap member and the inner cap member switches the closure element between a first configuration in which the at least two first capacitor plates and the second capacitor plate define a capacitor having a first capacitance and a second configuration in which the at least two first capacitor plates and the second capacitor plate define a capacitor having a second capacitance different from the first one.

2. The closure element according to claim 1, wherein, in the first configuration, the at least two first capacitor plates and the second capacitor plate are disposed in a first relative position and in the second configuration the at least two first capacitor plates and the second capacitor plate are disposed in a second relative position which is different from the first one.

3. The closure element according to claim 2, wherein, in the first relative position, the at least two first capacitor plates and the second capacitor plate are overlapping and, in the second relative position, the at least two first capacitor plates and the second capacitor plate are not overlapping.

4. The closure element according to claim 3, wherein an area of the at least two first capacitor plates, in combination, and an area of the second capacitor plate are substantially the same.

5. The closure element according to claim 3, wherein a shape of the at least two first capacitor plates, in combination, and a shape of the second capacitor plate are substantially the same.

6. The closure element according to claim 3, wherein each of the at least two first capacitor plates comprises at least a first portion shaped as a circular sector.

7. The closure element according to claim 6, wherein the first portions of the at least two first capacitor plates are next to each other on a same plane.

8. The closure element according to claim 6, wherein each of the at least two first capacitor plates further comprises a second portion having the shape of a circular sector, the first portion being concentric to the second portion, wherein each first portion is electrically connected to the respective second portion.

9. The closure element according to claim 3, wherein the second capacitor plate comprises at least a portion shaped as a circular sector.

10. The closure element according to claim 3, wherein the second capacitor plate comprises a plurality of portions, each portion being shaped as a circular sector; the portions being electrically connected to each other.

11. The closure element according to claim 1, wherein the outer cap member and the inner cap member are rotatably coupled.

12. The closure element according to claim 1, wherein the outer cap member and the inner cap member are movable along a longitudinal direction.

13. The closure element according to claim 1, wherein, in the first configuration, the second capacitor plate is shaped as a first shape and, in the second configuration, the second capacitor plate is shaped as a second shape which is different from the first one.

14. The closure element according to claim 13, wherein the second capacitor plate comprises a plurality of sections configured to be electrically connected to each other in the first configuration and electrically disconnected in the second configuration.

15. The closure element according to claim 14, wherein the second capacitor plate comprises a first ring attached to one of the outer cap member and the inner cap member and a second ring attached to the other of the outer cap member and the inner cap member; wherein the plurality of sections are connected between the first ring and the second ring.

16. The closure element according to claim 15, wherein the plurality of sections are connected to the first ring and the second ring by means of breakable bridges.

17. The closure element according to claim 15, wherein the first ring presents an edge connected to the outer cap member; the edge being shaped such that the first ring is fastened to the outer cap member; wherein the second ring presents an edge connected to the inner cap member; the edge being shaped such that the second ring is fastened to the inner cap member.

18. The closure element according to claim 14, wherein the plurality of sections are trapezoidal-shaped and angularly evenly spaced.

19. The closure element according to claim 1, wherein the inner cap member presents a groove arranged between the top wall and the side wall of the inner cap member, the groove facing the outer cap member; the outer cap member comprising a tooth arranged between the top wall and the side wall of the outer cap member; the tooth being slidingly housed in the groove; wherein the groove extends only in part along a circumferential extension of the inner cap member.

20. The closure element according to claim 1, wherein the transponder is an RFID tag.

21. The closure element according to claim 1, further comprising blocking means active between the outer cap member and the inner cap member to impede switching from the second configuration to the first configuration.

22. The closure element according to claim 21, wherein the blocking means comprises a spacer member operatively placed between the outer cap member and the inner cap member; the spacer member being switchable from a first arrangement in which it is fitted in a cavity formed at a joining portion between the top wall and the side wall of the inner cap member to a second arrangement in which the spacer member lies between the top wall of the inner cap member and the top wall of the outer cap member.

23. The closure element according to claim 1, wherein the transponder is an NFC tag.

* * * * *